United States Patent
Shimizu

(10) Patent No.: US 9,528,887 B2
(45) Date of Patent: *Dec. 27, 2016

(54) TEMPERATURE MEASUREMENT DEVICE

(75) Inventor: Sakiko Shimizu, Nagano (JP)

(73) Assignee: Seiko Epson Corporation, Tokyo (JP)

(*) Notice: Subject to any disclaimer, the term of this patent is extended or adjusted under 35 U.S.C. 154(b) by 531 days.

This patent is subject to a terminal disclaimer.

(21) Appl. No.: 13/270,342

(22) Filed: Oct. 11, 2011

(65) Prior Publication Data

US 2012/0109571 A1  May 3, 2012

(30) Foreign Application Priority Data

Oct. 29, 2010  (JP) .................. 2010-243291

(51) Int. Cl.
G06F 15/00 (2006.01)
G01K 13/00 (2006.01)
G01K 1/16 (2006.01)
G01K 7/42 (2006.01)

(52) U.S. Cl.
CPC .............. *G01K 13/002* (2013.01); *G01K 1/165* (2013.01); *G01K 7/42* (2013.01)

(58) Field of Classification Search
CPC ............ G01K 7/42; G01K 15/00; G01K 1/16; G01K 13/002; G01K 1/165; G01K 7/00; G06F 1/206; G06F 15/00
USPC ....................................................... 702/130
See application file for complete search history.

(56) References Cited

U.S. PATENT DOCUMENTS

| 3,933,045 | A  | * | 1/1976 | Fox ................... | G01K 1/16 374/134 |
| 6,179,466 | B1 | * | 1/2001 | Peuse ................ | G01J 5/0003 374/110 |
| 6,220,750 | B1 | * | 4/2001 | Palti ................. | G01K 1/16 374/164 |
| 6,837,618 | B1 | * | 1/2005 | Yamamoto ......... | G01J 5/0022 374/163 |

(Continued)

FOREIGN PATENT DOCUMENTS

| JP | 50-127679 A | 10/1975 |
| JP | 2006-308538 A | 11/2006 |

(Continued)

*Primary Examiner* — Hyun Park
*Assistant Examiner* — Mohammad Islam
(74) *Attorney, Agent, or Firm* — Global IP Counselors, LLP

(57) ABSTRACT

A temperature measurement device includes a temperature measurement part, a calculation part, and a control part for controlling the operation of the temperature measurement part and the calculation part. The temperature measurement part has a substrate having a first surface as a contact surface with a measured body, and a second surface as an environment-lateral surface which is opposite the first surface, a first temperature sensor, a second temperature sensor, and a third temperature sensor, and the first temperature sensor, the second temperature sensor, and the third temperature sensor measure a first temperature, a second temperature, and a third temperature a plurality of times under conditions in which the temperature of the environment varies, and the calculation part calculates a deep temperature in a deep part of the measured body by using the measured temperatures.

4 Claims, 25 Drawing Sheets

(56) References Cited

U.S. PATENT DOCUMENTS

| | | | |
|---|---|---|---|
| 6,890,096 B2* | 5/2005 | Tokita | G01K 7/42 374/100 |
| 7,249,883 B2 | 7/2007 | Kuroda et al. | |
| 7,942,825 B2* | 5/2011 | Ranganathan | A61B 5/01 374/107 |
| 8,716,629 B2* | 5/2014 | Klewer | A61B 5/0008 219/211 |
| 2002/0013637 A1 | 1/2002 | Redinbo et al. | |
| 2005/0043631 A1* | 2/2005 | Fraden | A61B 5/01 600/474 |
| 2005/0192491 A1* | 9/2005 | Cho | A61B 5/01 600/316 |
| 2005/0276309 A1* | 12/2005 | Koch | A61B 5/6831 374/208 |
| 2006/0047467 A1* | 3/2006 | Bedard | G01K 13/002 702/130 |
| 2006/0056487 A1* | 3/2006 | Kuroda et al. | 374/179 |
| 2006/0173375 A1* | 8/2006 | Koch | G01K 1/20 600/549 |
| 2007/0038141 A1* | 2/2007 | Koch | G01K 1/20 600/549 |
| 2007/0055171 A1* | 3/2007 | Fraden | G01K 1/165 600/549 |
| 2007/0282218 A1* | 12/2007 | Yarden | G01K 1/165 600/549 |
| 2007/0295713 A1* | 12/2007 | Carlton-Foss | A61B 5/01 219/497 |
| 2008/0170600 A1* | 7/2008 | Sattler | G01K 1/16 374/163 |
| 2008/0300819 A1* | 12/2008 | Koch | G01K 1/16 702/131 |
| 2009/0187115 A1* | 7/2009 | Yarden | A61B 5/01 600/549 |
| 2009/0296773 A1* | 12/2009 | Sattler | G01K 1/16 374/100 |
| 2009/0299682 A1* | 12/2009 | Yarden | G01K 1/16 702/131 |
| 2009/0306536 A1* | 12/2009 | Ranganathan | A61B 5/01 600/549 |
| 2010/0088060 A1* | 4/2010 | Padiy | G01K 1/16 702/136 |
| 2010/0121217 A1* | 5/2010 | Padiy et al. | 600/549 |
| 2010/0202488 A1* | 8/2010 | Wijnen | G01K 1/165 374/134 |
| 2011/0158284 A1* | 6/2011 | Goto | A61B 5/0008 374/163 |
| 2011/0191059 A1* | 8/2011 | Farrell | A61B 5/14532 702/130 |
| 2011/0205071 A1 | 8/2011 | Namekawa et al. | |
| 2011/0224936 A1* | 9/2011 | Shimizu | G01K 13/002 702/99 |
| 2011/0233290 A1 | 9/2011 | Borovinov | |
| 2011/0317737 A1* | 12/2011 | Klewer et al. | 374/29 |
| 2012/0024833 A1* | 2/2012 | Klewer | A61B 5/0008 219/211 |

FOREIGN PATENT DOCUMENTS

| | | | | |
|---|---|---|---|---|
| JP | 2008-076144 A | 4/2008 | | |
| JP | 2009-222543 A | 10/2009 | | |
| JP | 2010-236897 A | 10/2010 | | |
| NL | WO 2010116297 A1 * | 10/2010 | | A61B 5/0008 |

* cited by examiner

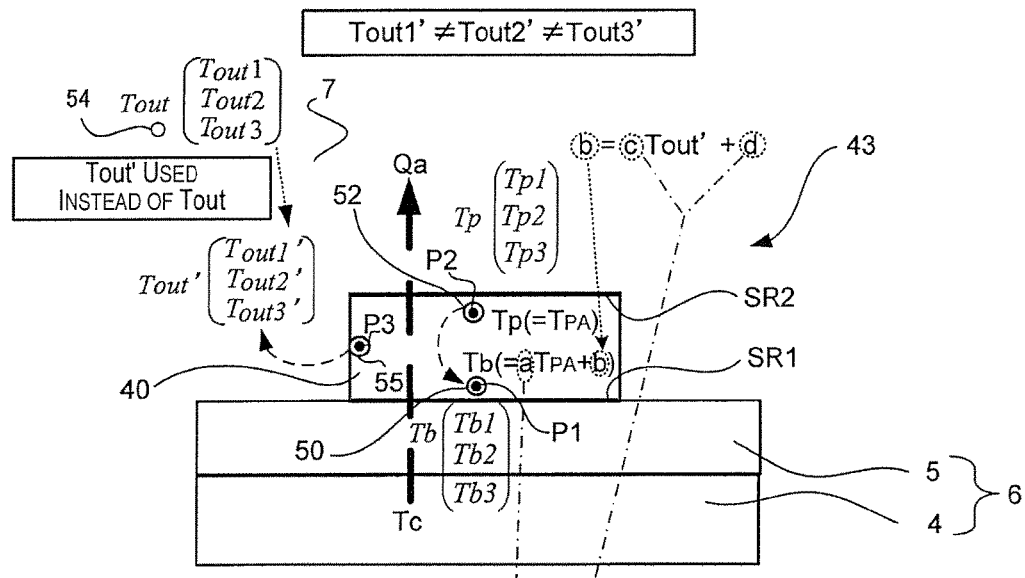
Fig. 1A
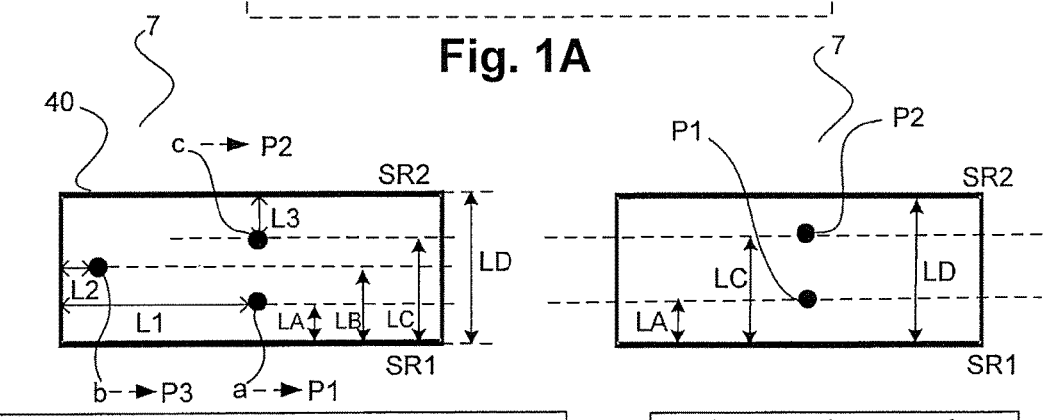
Fig. 1B  Fig. 1C
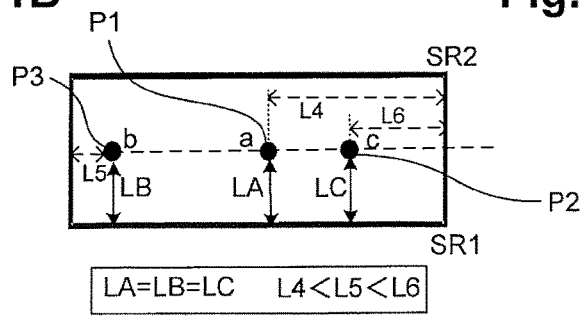
Fig. 1D

$$Tc + \Delta Tc = \frac{T3(T1-T2) - T1(T3-T4)}{(T1-T2) - (T3-T4)} \quad ---(F)$$

$$Tc + \Delta Tc = \frac{(aT_{PA}+b)[(aT_{PA}+b) - T_{PA}] - (aT_{PA}+b)[(aT_{PB}+b) - T_{PB}]}{[(aT_{PA}+b) - T_{PA}] - [(aT_{PB}+b) - T_{PB}]}$$

$$= \frac{b}{1-a} \cdot \frac{T_{PA} - T_{PB}}{T_{PA} - T_{PB}}$$

$$= \frac{b}{1-a} \quad ---(5)$$

$$\begin{pmatrix} Tb1 \\ Tb2 \\ Tb3 \end{pmatrix} = \begin{pmatrix} Tp1 & Tout1' & 1 \\ Tp2 & Tout2' & 1 \\ Tp3 & Tout3' & 1 \end{pmatrix} \begin{pmatrix} a \\ c \\ d \end{pmatrix} \quad ---\ (9)$$

$$\begin{pmatrix} a \\ c \\ d \end{pmatrix} = \begin{pmatrix} Tp1 & Tout1' & 1 \\ Tp2 & Tout2' & 1 \\ Tp3 & Tout3' & 1 \end{pmatrix}^{-1} \begin{pmatrix} Tb1 \\ Tb2 \\ Tb3 \end{pmatrix} \quad ---\ (10)$$

$$Tc = \frac{d}{1-a-c} \quad ---------\ (1)$$

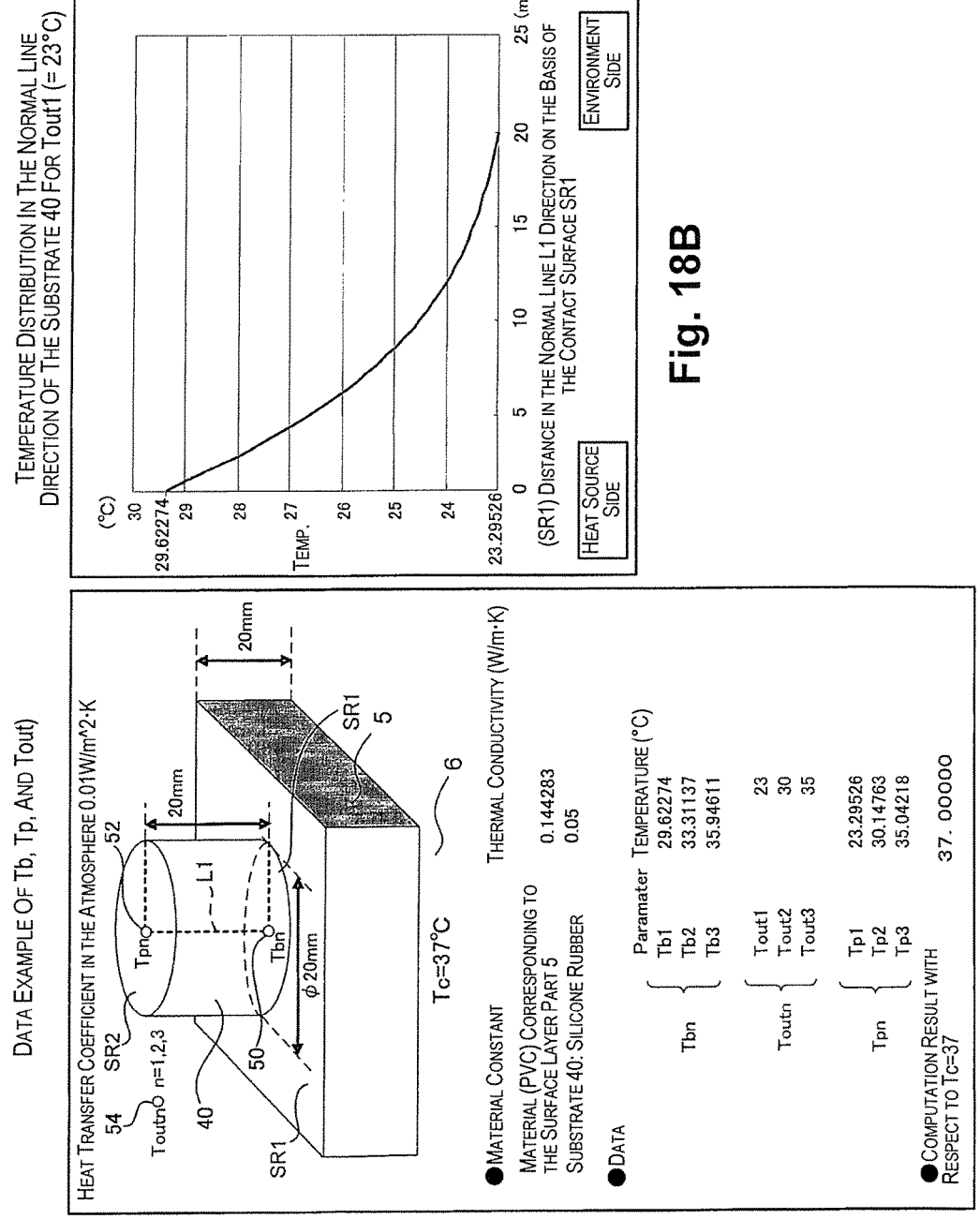

TEMPERATURE MEASUREMENT DEVICE

CROSS-REFERENCE TO RELATED APPLICATIONS

This application claims priority to Japanese Patent Application No. 2010-243291 filed on Oct. 29, 2010. The entire disclosure of Japanese Patent Application No. 2010-243291 is hereby incorporated herein by reference.

BACKGROUND

Technological Field

The present invention relates to a temperature measurement device or the like.

Background Technology

A health state, basal metabolism state, mental state, or other biological information, for example, is obtained from the body temperature, which is a piece of basic vital information. In a case in which the health state, basal metabolism state, or mental state of a person or animal is estimated based on the body temperature of the person or animal, information on the temperature of a deep part (deep temperature) is necessary, rather than the temperature of a surface part.

In a case in which the temperature inside a furnace, duct, or the like is measured, when the internal temperature (i.e., deep temperature) can be measured by a temperature measurement device that is provided on the outside of the furnace or duct, there is no need for work to place the temperature measurement device inside the furnace, duct, or the like, and there is also no risk of the temperature measurement device being corroded by an internal substance.

A clinical thermometer for measuring a deep temperature is described in Patent Citation 1, for example. In Patent Citation 1, two temperature measurement parts (first temperature measurement part and second temperature measurement part) are disposed parallel to each other at a distance L on a human body. A first heat insulator is provided on the environment (atmosphere) side of the first temperature measurement part, and a second heat insulator is also provided on the environment (atmosphere) side of the second temperature measurement part, and by using a different material for the second heat insulator than the first heat insulator, the two temperature measurement parts have different thermal resistance values, and two different heat fluxes are thereby created. The first temperature measurement part measures a first body surface temperature and a first intermediate temperature, and the second temperature measurement part measures a second body surface temperature and a second intermediate temperature. These four units of temperature data are used to measure the deep temperature by a predetermined arithmetic equation.

Specifically, for the first heat flux, by focusing on a point at which the heat flux flowing through the first temperature measurement part and the heat flux from a deep part of the body to the body surface are equal, a first equation is obtained which relates the deep temperature, a measured temperature, and the thermal resistance. A second equation relating the deep temperature, a measured temperature, and the thermal resistance is obtained in the same manner for the second heat flux. By solving a system of equations, the deep temperature can be accurately calculated even when the thermal resistance value of the body is unknown.

Japanese Laid-open Patent Publication No. 2006-308538 (Patent Citation 1) discloses such clinical thermometer for example.

SUMMARY

Problems to be Solved by the Invention

In the technique described in Patent Citation 1, the heat balance between the temperature measurement parts and the surrounding environment (atmosphere) is not considered, as relating to computing the deep temperature. In other words, in the technique described in Patent Citation 1, it is assumed that an ideal system can be formed in which no heat balance occurs.

However, in a case in which the temperature measurement parts are further reduced in size, a heat balance between the environment (atmosphere) and the side surfaces of the temperature measurement parts is manifested, and the measurement error corresponding to the difference of the heat balance can no longer be ignored. Although the measurement error is slight, the presence of a measurement error is incontrovertible.

Through at least one aspect of the invention, a deep temperature can be measured with higher precision.

Means Used to Solve the Above-Mentioned Problems (1) The temperature measurement device according to an aspect of the invention includes a temperature measurement part, a calculation part, and a control part for controlling the operation of the temperature measurement part and the calculation part; wherein the temperature measurement part has a substrate as a heating medium having a first surface as a contact surface for contacting a measured body; a first temperature sensor for measuring the temperature at a first measurement point of the substrate as a first temperature; a second temperature sensor for measuring the temperature at a second measurement point different from the first measurement point of the substrate as a second temperature; and a third temperature sensor for measuring the temperature at a third measurement point different from the first measurement point and the second measurement point, as a third temperature which is a temperature substituted as the temperature of an environment surrounding the substrate; wherein the first measurement point, the second measurement point, and the third measurement point are positioned on an external surface of the substrate or inside of the substrate; the first temperature sensor, the second temperature sensor, and the third temperature sensor measure the first temperature, the second temperature, and the third temperature a plurality of times under conditions in which the temperature of the environment varies; and the calculation part calculates a deep temperature in a deep part of the measured body distant from the first surface, on the basis of a deep temperature calculation equation, on the basis of the first temperature, the second temperature, and the third temperature obtained by the plurality of measurements.

In the technique, different types of heat insulators are used in two temperature measurement parts to generate two different heat fluxes under conditions in which the environment temperature is constant, but in the present aspect, a heat flux is generated in each of at least two systems in which the environment temperature varies. The term "environment" is used in the following description, but the "environment" is an atmosphere or other heating medium, for example, and can also be referred to as a surrounding medium or an environment medium.

In the heat flow model of the technique, the temperature of the environment (hereinafter referred to as the environment temperature) in the two temperature measurement systems have the same value (i.e., are constant). The heat flow that occurs between the deep temperature and the environment temperature in each system is thereby constant, and this condition is assumed in the technique. The condition that the heat flow from the measured body to the environment, e.g., in the vertical direction, is constant is established under the assumption that no heat balance occurs in which a portion of the heat flow in the vertical direction escapes to the environment via a lateral surface of the substrate, for example.

However, as the temperature measurement device is further reduced in size, and the size of the substrate decreases, a heat balance (e.g., an escape of heat from a lateral surface of the substrate) between the measured body and the environment is manifested. In this case, the assumption of a constant heat flow between the deep temperature Tc and the environment temperature Tout is no longer satisfied.

In the present aspect, however, one end of each heat flow in the plurality of heat flow systems is an environment in which temperature fluctuation is allowed. The present aspect is thereby not subject to the limitation of the technique, in which the heat flow between the environment temperature and the deep temperature must be constant between the plurality of heat flow systems. In other words, the movement of heat due to the heat balance is inherently included in the heat flux of each system, and between the environment temperature (arbitrary temperature) and the deep temperature of the measured body, there is only a heat flow which also includes also the heat balance component.

In a model of the heat flow system such as described above, the temperature (first temperature and second temperature) of any two points (first measurement point and second measurement point) in the substrate can be expressed by an equation which includes the environment temperature as a variable (parameter). When the deep temperature and the environment temperature are equal, the heat balance is zero. Therefore, when calculating the deep temperature, for example, the measurement error due to heat balance can be reduced to zero by imparting the condition that the deep temperature and the environment temperature are equal.

When the calculation equation used as the deep temperature calculation equation is in a form which takes the difference (ratio) of temperature information that is measured based on two heat fluxes of different systems, the components corresponding to the heat balance, which are included in the temperature information obtained from each system, cancel each other out and are no longer visible. In other words, no problems arise from the fact that a heat balance occurs between the substrate and the environment, or that a heat balance occurs between the measured body and the environment.

By such a measurement principle, the deep temperature of the measured body can be measured with higher precision. The effect of a heat balance on the measurement is generally more significant the smaller the size of the temperature measurement device is, but in the present aspect, since the error due to the heat balance can be suppressed, reduced size of the temperature measurement device and extremely precise measurement can be obtained at the same time.

In the present aspect, instead of providing a thermometer in the environment and directly measuring the environment temperature Tout, the temperature (i.e., third temperature) Tout' of a third measurement point positioned on the external surface of the substrate or inside the substrate is measured by the third temperature sensor. The third temperature Tout' is then used in place of the environment temperature Tout. In a case in which a temperature sensor is provided outside the substrate in order to measure the temperature (environment temperature) Tout of the environment, a disadvantage arises in terms of reducing the size of the temperature measurement device. In the present aspect, three temperature sensors, i.e., the first temperature sensor, the second temperature sensor, and the third temperature sensor, can be consolidated in the substrate. The temperature measurement device can therefore be further reduced in size. As described above, the third temperature Tout' is a temperature used instead of the environment temperature Tout when calculating the deep temperature and is a concept distinct from the environment temperature Tout, but the third temperature Tout' is utilized as a temperature which corresponds to the environment temperature Tout in calculating the deep temperature. In other words, the third temperature Tout' can be referred to as a temperature that corresponds to the temperature of the environment around the substrate. The "third temperature" is therefore sometimes referred to as the "environment equivalent temperature" in the description given hereinafter.

Ideally, Tout=Tout', where Tout is the environment temperature, and Tout' is the third temperature (environment equivalent temperature), but in actual practice, since the third temperature (environment equivalent temperature) Tout' is not only affected by the environment temperature, but also by heat flows which occur between the measured body and the environment, Tout and Tout' are usually not equal.

However, in the deep temperature calculation equation used in the present aspect, the correlation between the measured plurality of temperature data is important, rather than the absolute value of the measured values, and when the correlation is satisfied, using the third temperature Tout' in place of the environment temperature Tout has no effect on the measurement precision as such.

The correlation described above is a correlation whereby the same linearity is maintained even when the third temperature Tout' is used in place of the environment temperature Tout when the first temperature Tb and the second temperature Tp are linear with respect to the environment temperature Tout, for example. Since the temperature of any one point in the substrate can be expressed by a linear function which includes the environment temperature Tout as a variable, the third temperature Tout' is also linear with respect to the environment temperature Tout, and when the environment temperature Tout is determined, the third temperature Tout' is also unambiguously determined by a linear function. Therefore, a linear function established between the environment temperature Tout and the first temperature Tb and second temperature Tp can be considered to be established in the same manner between the third temperature Tout' and the first temperature Tb and second temperature Tp. For such a reason, high measurement precision can be maintained even when the third temperature Tout' is used in place of the environment temperature Tout.

In the temperature measurement device of the present aspect, the deep temperature can be calculated by executing a plurality of temperature measurements (acquisitions of temperature information) in different environment temperatures, and executing calculation by using the plurality of obtained temperature data. Through this configuration, only one substrate is essentially needed, and there is no need to provide two substrates (two temperature measurement parts), as in the technique described in Patent Citation 1. The size of the temperature measurement device can thereby be reduced in this respect as well. In the clinical thermometer of Patent Citation 1, heat insulators composed of different materials must be provided in the surface layer parts of the temperature measurement parts in order to obtain a different thermal resistance value in each temperature measurement part, but in the present aspect, only one substrate is essentially needed as the heating medium for transmitting heat, and the structure of the temperature measurement device can be simplified in this respect. A material (e.g., silicone rubber) having a predetermined thermal conductivity (or thermal resistance), for example, may be used as the substrate.

(2) In the temperature measurement device according to another aspect of the invention, the control part divides a time period for measuring the first temperature, the second temperature, and the third temperature into a plurality of time periods, and causes the first temperature sensor and the second temperature sensor to execute a plurality of temperature measurements at a predetermined interval for each time period; and the calculation unit determines the first temperature, the second temperature, and the third temperature for each time period by averaging which uses a plurality of temperature measurement data obtained by the plurality of measurements; and uses the first temperature, the second temperature, and the third temperature determined for each the time period to execute calculation by the deep temperature computation equation, and calculates the deep temperature in a deep part of the measured body.

In the present aspect, an example is clarified of a measurement method for ensuring that "the first temperature, the second temperature, and the third temperature are measured a plurality of times under conditions in which the environment temperature varies."

Methods for "varying the environment temperature" include active methods using an air conditioner or the like, and passive methods which focus on surges (minute fluctuations) in the environment temperature on a time axis to adjust the measurement timing. The present aspect relates to the latter type of passive method.

For example, when "the first temperature at the first measurement point of the substrate, the second temperature at the second measurement point of the substrate, and the third temperature at the third measurement point of the substrate are measured three times," it is sometimes impossible to satisfy the condition of "measuring three times in different environment temperatures" when the time interval between the three measurements is very short. Therefore, in the present aspect, a first time period for the first measurement, a second time period for the second measurement, and a third time period for the third measurement are provided in such a case. In the first time period, a plurality of temperature measurements is executed, and the values of the first temperature measurement are determined by averaging (simple arithmetic mean or weighted average) the measurement results. The term "averaging" is broadly interpreted, and also includes cases in which a complex calculation equation is used, for example.

For example, in the first time period, a first temperature measurement is performed three times at a predetermined interval, and in a case in which three units of temperature data are obtained relating to the first temperature, the first temperature in the first measurement is determined by averaging based on the three units of temperature data. The second temperature is determined in the same manner. For the third temperature as well, three measurements are executed in the first time period, and the third temperature relating to the first measurement may be obtained by averaging based on the temperature data obtained by the measurements.

In the second time period as well, a plurality of temperature measurements is executed, and the values of the second temperature measurement are determined by averaging (simple arithmetic mean or weighted average) the measurement results. The third temperature is determined in the same manner. A plurality of temperature measurements is executed in the third time period as well, and the values of the third temperature measurement are determined by averaging (simple arithmetic mean or weighted average) the measurement results. The example described above is merely an example, and is not limiting.

Through the method of the present aspect, a plurality of units of temperature data measured in different environment temperatures can be obtained relatively easily for the first temperature, second temperature, and third temperature without using an air conditioner or the like to actively vary the temperature of the environment.

(3) The temperature measurement device according to another aspect of the invention further includes an environment temperature adjustment part whereby the temperature of the environment can be varied; wherein the temperature of the environment is varied by the environment temperature adjustment part each time a measurement ends when the control part causes the first temperature sensor, the second temperature sensor, and the third temperature sensor to execute the plurality of measurements.

In the present aspect, another example is clarified of a measurement method for ensuring that "the first temperature, the second temperature, and the third temperature are measured a plurality of times under conditions in which the environment temperature varies."

In the present aspect, the temperature measurement part is further provided with an environment temperature adjustment part. The environment temperature adjustment part has the function of varying the environment temperature. A regulator of a set temperature of an external air conditioner provided outside the temperature measurement device, for example, may be used as the environment temperature adjustment part. A fan (electric fan), an air flow generating part for generating an air flow, or the like provided inside the temperature measurement device, for example, may be used as the environment temperature adjustment part. Through the use of the environment temperature adjustment part, the environment temperature can be reliably varied for each measurement. The environment temperature can also be set to an exact temperature. A large difference can also be set between the environment temperature of the first measurement and the environment temperature of the second measurement.

(4) The temperature measurement device according to another aspect of the invention further includes a timing control information input part for inputting timing control information for determining the timing at which the first temperature sensor, the second temperature sensor, and the third temperature sensor execute the plurality of measurements; wherein the control part causes the first temperature sensor, the second temperature sensor, and the third temperature sensor to execute temperature measurement each time the timing control information is inputted from the timing control information input part.

In the present aspect, the temperature measurement part is provided with a timing control information input part for inputting timing control information for determining the timing of executing the plurality of measurements. In the present aspect, it is assumed that "conditions in which the environment temperature varies for each measurement" are ensured by the user's own action.

For example, the user sets the temperature of an external air conditioner provided outside the temperature measurement device to a first temperature when the first measurement is performed, and when a predetermined time elapses from this setting, timing control information is inputted via the timing control information input part. The control part causes the first temperature sensor through third temperature sensor to execute a single temperature measurement, for example, each time the timing control information is inputted from the timing control information input part. After the user subsequently sets the temperature of the air conditioner to a second temperature, the operation whereby timing control information is inputted is preferably repeated.

In the present aspect, since the user varies the environment temperature at each measurement, the temperature measurement device is not burdened with managing the environment temperature. The above example is merely an example.

(5) In the temperature measurement device according to another aspect of the invention, when the first temperature is expressed by a function including a plurality of constants, the second temperature and the third temperature being variables, the calculation part computes the plurality of constants on the basis of the measured first temperature, the measured second temperature, and the measured third temperature, and computes the deep temperature of the measured body by calculation according to the deep temperature computation equation by using the plurality of computed constants.

When the temperature of the measured body changes, the first temperature on the measured body side of the substrate changes, and the second temperature on the environment side of the substrate also changes. The technique focuses on only the change in temperature of two points in the substrate originating from the measured body. The present aspect instead focuses also on the change in temperature in the substrate originating from the environment.

In other words, when the temperature of the environment (atmosphere or the like) changes, the second temperature on the environment side of the substrate changes, and the first temperature on the measured body side of the substrate also changes. Through computer simulation, it is apparent that a predetermined regularity exists in the temperature change of two points in the substrate originating from the environment.

In other words, the first temperature Tb can be expressed by a function which includes a plurality of constants, the second temperature Tp and the third temperature Tout being variables. Focusing on the fact that the heat balance is zero when the deep temperature Tc and the environment temperature Tout are equal, the deep temperature computation equation is obtained by modifying the function described above.

However, the values of the plurality of constants included in the function described above must be determined in order to compute the deep temperature on the basis of the computation equation. The calculation part therefore first computes the values of the abovementioned plurality of constants on the basis of the temperature data obtained as the results of the plurality of measurements, for example. However, during this calculation, the environment equivalent temperature (third temperature) is used in place of the environment temperature Tout. As described above, high measurement precision is obtained even when such a substitution of temperature data is made.

The calculation part then uses the values of the constants to execute calculation by the computation equation (compensation calculation equation) and compute the deep temperature. A nearly ideal deep temperature is thereby calculated, from which the effects of the heat balance are removed.

(6) In the temperature measurement device according to another aspect of the invention, the first temperature is expressed by a first linear function having a first slope and a first intercept, the second temperature being a variable; the first intercept of the first linear function is expressed by a second linear function having a second slope and a second intercept, the third temperature being a variable; the plurality of constants corresponds to the first slope, the second slope, and the second intercept; and when $Tb1$, $Tp1$, and $Tout1'$ are the first temperature, the second temperature, and the third temperature, respectively, obtained by a first measurement; $Tb2$, $Tp2$, and $Tout2'$ are the first temperature, the second temperature, and the third temperature, respectively, obtained by a second measurement; and $Tb3$, $Tp3$, and $Tout3'$ are the first temperature, the second temperature, and the third temperature, respectively, obtained by a third measurement, the calculation part computes the values of the first slope, the second slope, and the second intercept on the basis of the first temperature $Tb1$, the second temperature $Tp1$, and the third temperature $Tout1'$ obtained by the first measurement, the first temperature $Tb2$, the second temperature $Tp2$, and the third temperature $Tout2'$ obtained by the second measurement, and the first temperature $Tb3$, the second temperature $Tp3$, and the third temperature $Tout3'$ obtained by the third measurement, and computes the deep temperature of the measured body by calculation according to the deep temperature calculation equation by using the computed values of the first slope, the second slope, and the second intercept.

Through computer simulation, it is apparent that the first temperature (temperature of the measured object side of the substrate) is linear with respect to the second temperature (temperature of the environment side of the substrate), and that the first temperature can thus be expressed by a first linear function having a first slope and a first intercept, the second temperature being a variable. Specifically, the first temperature can be expressed by the following equation: (First temperature)=(First slope)·(Second temperature)+(First intercept).

Through computer simulation, it is apparent that the first intercept in the first linear function is linear with respect to the third temperature, and that the first intercept of the first linear function can thus be expressed by a second linear function having a second slope and a second intercept, the third temperature being a variable. Specifically, the first intercept can be expressed by the following equation: (First intercept)=(Second slope)·(Third temperature)+(Second intercept).

The following expression is obtained as a result: (First temperature)=(First slope)·(Second temperature)+(Second slope)·(Third temperature)+(Second intercept). This relational expression corresponds to the "function including a plurality of constants, the second temperature and the third temperature being variables," described in aspect (5) above. Consequently, the "plurality of constants" corresponds to the "first slope," the "second slope," and the "second intercept" in the equation described above. In other words, the values of three constants must be calculated.

Therefore, at least three temperature measurements, for example, are executed, and a first temperature, second temperature, and third temperature are obtained as a set for each temperature measurement. When the obtained temperature values are substituted into the function described above, i.e., the relational expression (First temperature)=(First slope)·(Second temperature)+(Second slope)·(Third temperature)+(Second intercept), three equations are obtained, i.e., a ternary system of equations including the following three variables: (First slope), (Second slope), and (Second intercept). By solving this ternary system of equations, the values of the "plurality of constants," i.e., the "first slope," the "second slope," and the "second intercept" can be determined (although this method is not limiting).

(7) In the temperature measurement device according to another aspect of the invention, the calculation part computes the values of a, c, and d by the equation below, where a is the first slope, c is the second slope, and d is the second intercept:

[Eq. 1]

$$\begin{pmatrix} a \\ c \\ d \end{pmatrix} = \begin{pmatrix} Tp1 & Tout1 & 1 \\ Tp2 & Tout2 & 1 \\ Tp3 & Tout3 & 1 \end{pmatrix}^{-1} \begin{pmatrix} Tb1 \\ Tb2 \\ Tb3 \end{pmatrix}$$

and
the calculation part computes the deep temperature Tc by a first computation equation shown below as the deep temperature calculation equation.

[Eq. 2]

$$Tc = \frac{d}{1-a-c}$$

In the present aspect, the "first slope," the "second slope," and the "second intercept" as the plurality of constants described in the aspect of (5) above are expressed as the plurality of constants a, c, and d.

The above function (First temperature)=(First slope)·(Second temperature)+(Second slope)·(Third temperature)+(Second intercept) can be specifically expressed as "Tb=a·Tp+c·Tout'+d," where Tb is the first temperature, Tp is the second temperature, Tout' is the third temperature (environment equivalent temperature), and a, c, and d are constants. The ternary system of equations described above can thereby be expressed as shown below.

[Eq. 3]

$$\begin{pmatrix} Tb1 \\ Tb2 \\ Tb3 \end{pmatrix} = \begin{pmatrix} Tp1 & Tout1 & 1 \\ Tp2 & Tout2 & 1 \\ Tp3 & Tout3 & 1 \end{pmatrix} \begin{pmatrix} a \\ c \\ d \end{pmatrix}$$

By substituting the calculated values of a, c, and d into the first computation equation and executing the calculation, a substantially ideally corrected deep temperature Tc is obtained that is not affected by the heat balance.

(8) In the temperature measurement device according to another aspect of the invention, when Tb1, Tp1, and Tout1' are the first temperature, the second temperature, and the third temperature obtained by a first measurement; and Tb2, Tp2, and Tout2' are the first temperature, the second temperature, and the third temperature obtained by a second measurement, the value of the Tout2' being different from the value of the Tout1', the calculation part executes calculation by a second computation equation as the deep temperature calculation equation, by using the first temperature Tb1 and the second temperature Tp1 obtained by the first measurement, and the first temperature Tb2 and the second temperature Tp2 obtained by the second measurement, and computes the deep temperature Tc; and the second computation equation is expressed as shown below.

[Eq. 4]

$$Tc = \frac{Tb2(Tb1 - Tp1) - Tb1(Tb2 - Tp2)}{(Tb1 - Tp1) - (Tb2 - Tp2)}$$

In the present aspect, at least two temperature measurements (acquisitions of temperature information) are executed, and the environment temperature is varied in each temperature measurement. This means that the value of the third temperature Tout' is varied.

When two temperature measurements are executed with different third temperatures, a first heat flux system is formed in which the starting end is the deep part of the measured body, and the terminal end is the environment (atmosphere or the like), for example, in the first measurement. In the second measurement, a second heat flux system is formed in which the starting end is the deep part of the measured body, and the terminal end is the environment (atmosphere or the like), for example. Since the environment temperature Tout (and the third temperature Tout') is different in each system, the heat fluxes of each system are mutually different.

Since the terminal end is the environment in these heat flux systems, the concept of the heat balance difference, which was a problem in the technique, does not occur. In other words, the environment temperature Tout (and the third temperature Tout') is unambiguously determined so as to encompass the heat balance.

The thermal characteristics (e.g., thermal conductivity) of the substrate used are the same in the first heat flux system and the second heat flux system (this is naturally expected, since a shared substrate is used). In other words, there is no change in the distribution of thermal resistance between the first system and the second system. Therefore, when the first measurement point and second measurement are set in the substrate, the value of (Difference in temperature between the first measurement point and the second measurement point)/(Difference between the deep temperature Tc of the measured body and the temperature of the first measurement point) is the same for the first heat flux system and the second heat flux system. The equation below is thus established.

[Eq. 5]

$$\frac{(Tb1 - Tp1)}{(Tc - Tb1)} = \frac{(Tb2 - Tp2)}{(Tc - Tb2)}$$

When this equation is solved for Tc, the second computation equation described above is obtained. Since the concept of the error component ΔTc in the technique does not occur, a substantially ideal deep temperature Tc is obtained by the second computation equation.

Specifically, since the second computation equation is a calculation equation formatted to obtain the ratio of the difference of temperature information measured based on heat fluxes of two different systems, the components corresponding to the heat balance, which are included in each unit of temperature information, cancel out and are no longer visible. In other words, no problems arise from the occurrence of a heat balance between the substrate and the environment, or by the occurrence of a heat balance between the measured body and the environment.

The second computation equation appears the same as the computation equation in the technique in terms of format, but the second computation equation is fundamentally different from the computation equation of the technique. In other words, the second computation equation is derived from the perspective that the ratio of the thermal resistance in the substrate is the same (shared), on the basis of the data obtained from two heat flux systems in which the environment is the terminal end, and the second computation equation is fundamentally different.

In the present aspect, the third temperature Tout' is not directly related to the deep temperature Tc computation as such. However, as described above, the environment temperature in the first measurement and the environment temperature in the second measurement must be different, and when both are the same, the deep temperature cannot be correctly computed. The third temperature Tout' measured by the third temperature sensor may thus be used to confirm whether a condition for enabling computation (the condition that the third temperature is different in the first measurement and the second measurement) is satisfied, i.e., to determine whether to perform calculation.

BRIEF DESCRIPTION OF THE DRAWINGS

FIGS. 1A through 1D are views showing the method for measuring a deep temperature in a first embodiment;

FIGS. 18A and 18B are views showing another example of the relationship between the temperature distribution inside the substrate and the measurement results;

DETAILED DESCRIPTION OF EXEMPLARY EMBODIMENTS

Before the description of embodiments of the invention, the calculation equation for calculating the deep temperature in Patent Citation 1 will be briefly described.

Figure 23A:
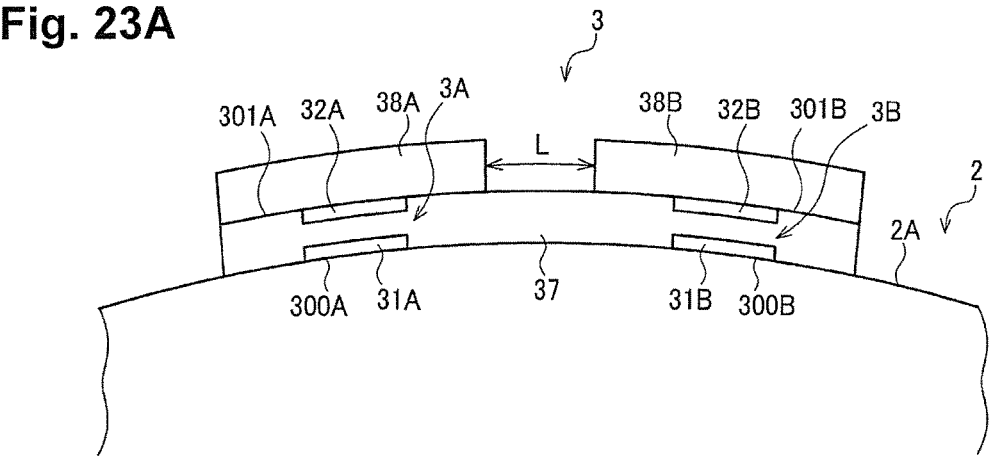
FIGS. 23A through 23C are views showing an example of the clinical thermometer described in FIG. 5 of Patent Citation 1 (Japanese Laid-open Patent Publication No. 2006-308538)
Figure 23B:
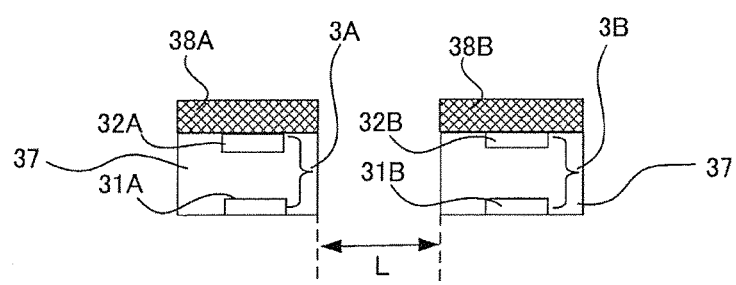
Figure 23C:
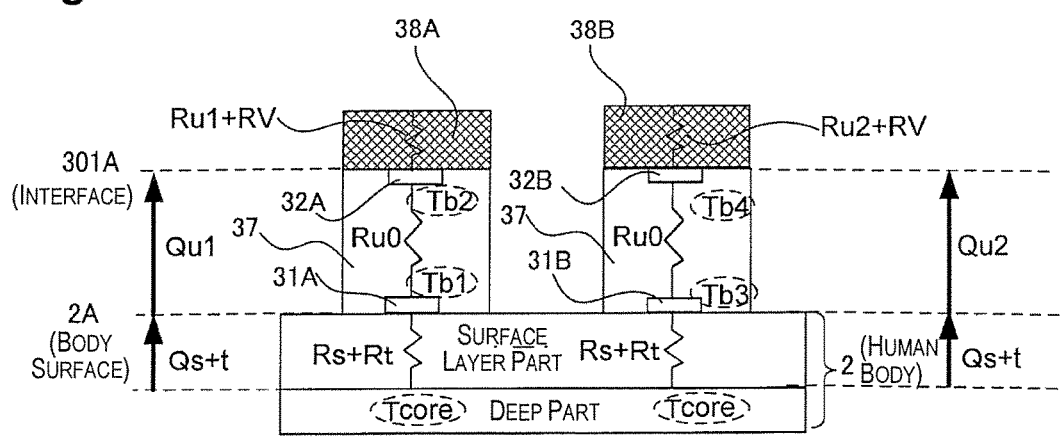

FIGS. 23A through 23C are views showing an example of the clinical thermometer described in FIG. 7 of Patent Citation 1 (Japanese Laid-open Patent Publication No. 2006-308538). The content of FIG. 7 of Patent Citation 1 is shown without modification in FIG. 23A. FIGS. 23B and 23C are supplementary views added herein to describe the operation of the example shown in FIG. 7 of Patent Citation 1.

As shown in FIG. 23A, a clinical thermometer main body 3 is provided on a human body 2. The clinical thermometer main body 3 is provided with a first temperature measurement part 3A and a second temperature measurement part 3B. The first temperature measurement part 3A is provided with a heat insulator 37 which has a contact surface 300A for contacting a body surface 2A of the human body 2, and, as heat flux adjustment section, a heat insulator 38A as a first heat insulator provided between the heat insulator 37 and the outside air. The second temperature measurement part 3B is provided with the heat insulator 37 which has a contact surface 300B for contacting the body surface 2A in a position at a distance L from the contact position of the first temperature measurement part 3A, and, as a heat flux adjustment section, a heat insulator 38B as a second heat insulator between the heat insulator 37 and the outside air. Specifically, the heat insulator 37 is shared by the first temperature measurement part 3A and the second temperature measurement part 3B, and has a shared thermal resistance value.

The first temperature measurement part 3A is provided with a body surface sensor 31A as a first basis temperature measurement part for measuring the temperature of the body surface 2A as a first basis temperature; and a middle sensor 32A as a first reference temperature measurement part for measuring the temperature of an interface 301A between the heat insulator 37 and the heat insulator 38A as a first reference temperature.

The second temperature measurement part 3B is also provided with a body surface sensor 31 B as a second basis temperature measurement part for measuring the temperature of the body surface 2A as a basis temperature, and a middle sensor 32B as a second reference temperature measurement part for measuring the temperature of an interface 301B between the heat insulator 37 and the heat insulator 38B as a second reference temperature. The material of the heat insulators 38 is different from the material of the heat insulator 37. Consequently, the first temperature measurement part 3A and the second temperature measurement part 3B each have a different thermal resistance value, and a different heat flux occurs in each temperature measurement part.

FIG. 23B is a simplified view of the structure of the clinical thermometer main body shown in FIG. 23A. FIG. 23C shows the thermal resistance and heat flux in the first temperature measurement part 3A and second temperature measurement part 3B shown in FIG. 23B.

As shown in FIG. 23C, the thermal resistance of a surface layer part of the human body 2 is Rs, and a contact resistance Rt is present at the location of contact between the temperature measurement parts 3A, 3B and the human body 2. The value of (Rs+Rt) is unknown. The thermal resistance of the shared heat insulator 37 is Ru0 (known). The thermal resistance of the heat insulator 38A provided on the atmosphere side of the first temperature measurement part 3A is (Ru1+RV). The term RV is the thermal resistance of the surface layer part near the atmosphere. The thermal resistance of the heat insulator 38B provided on the atmosphere side of the second temperature measurement part 3B is (Ru2+RV).

In FIG. 23C, the temperatures measured by the body surface sensors 31A, 31B are designated as Tb1, Tb3, and the temperatures measured by the middle sensors 32A, 32B are designated as Tb2, Tb4.

As indicated by a thick-line arrow on the left side of FIG. 23C, a heat flux occurs in the first temperature measurement part 3A from a deep part of the human body 2 to the interface 301A at which the heat insulator 37 and the heat insulator 38A are in contact. The heat flux can be divided into a heat flux Q (s+t) from the deep part (temperature Tcore) of the human body 2 to the body surface 2A, and a heat flux Qu1 from the body surface 2A to the interface 301A. In the second temperature measurement part 3B as well, a heat flux occurs from the deep part of the human body 2 to the interface 301A at which the heat insulator 37 and the heat insulators 38 are in contact, and this heat flux can be divided into a heat flux Q (s+t) from the deep part (temperature Tcore) of the human body 2 to the body surface 2A, and a heat flux Qu2 from the body surface 2A to the interface 301A.

The heat flux can be calculated by dividing the difference in temperature between two points by the thermal resistance value between the two points. The heat flux Q (s+t) is thus indicated by Equation (A) below, the heat flux Qu1 is indicated by Equation (B) below, and the heat flux Qu2 is indicated by Equation (C) below.

$$Q(s+t)=(Tcore-Tb1)/(Rs+Rt) \quad (A)$$

$$Qu1=(Tb1-Tb2)/Ru0 \quad (B)$$

$$Qu2=(Tb3-Tb4)/Ru0 \quad (C)$$

In these equations, the heat flux in the human body 2 and the heat flux in the temperature measurement parts 3A, 3B are equal. Thus, Q (s+t)=Qu1, and in the same manner, Q (s+t)=Qu2. Consequently, Equation (D) below is obtained from Equation (A) and Equation (B), and Equation (E) below is obtained from Equation (A) and Equation (C).

$$Tcore=\{(Rs+Rt)/Ru0\}\cdot(Tb1-Tb2)+Tb1 \quad (D)$$

$$Tcore=\{(Rs+Rt)/Ru0\}\cdot(Tb3-Tb4)+Tb3 \quad (E)$$

Figure 24:
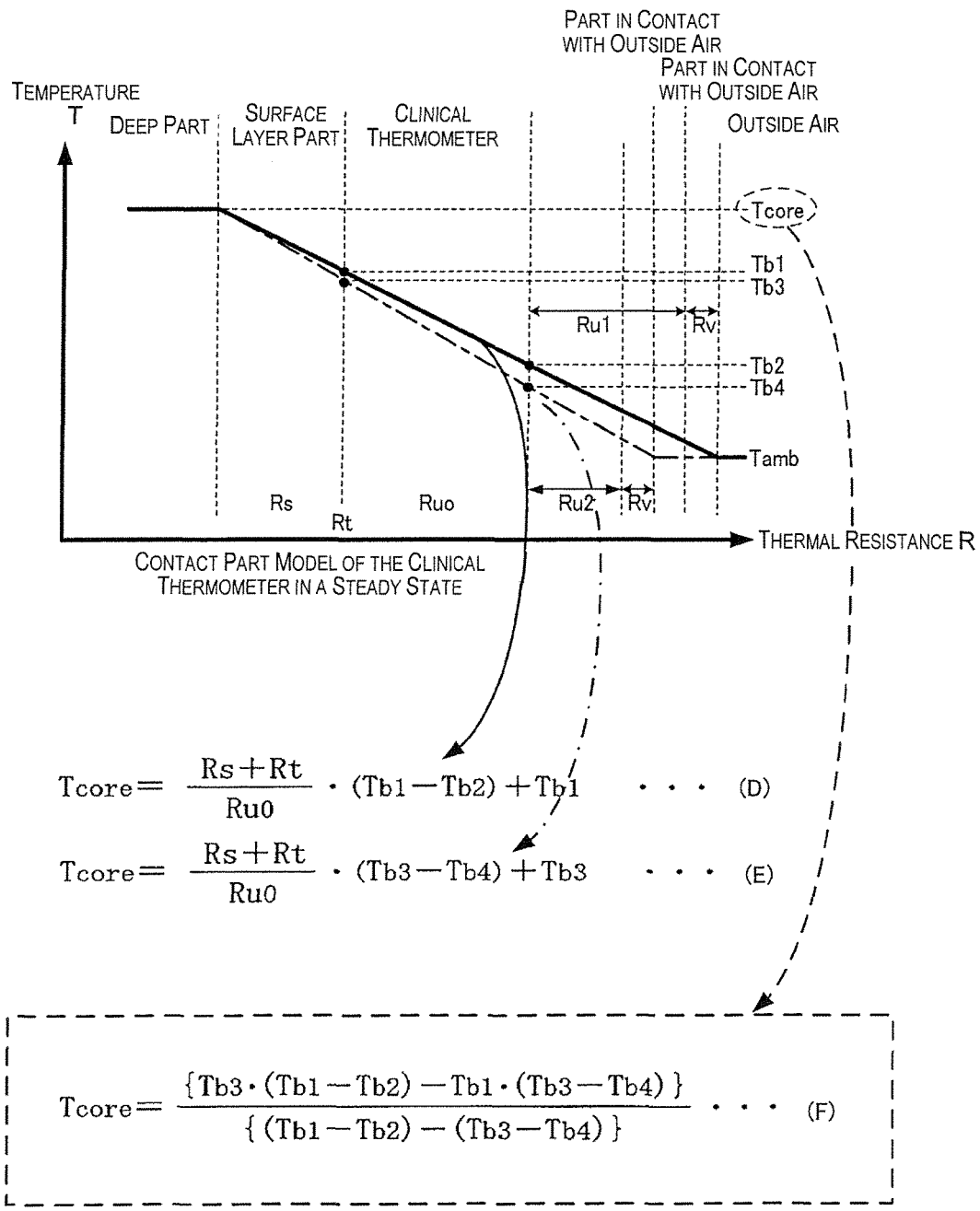
FIG. 24 is a view showing a model of the contact part of the clinical thermometer when the heat flux is in a steady state, and the deep temperature computation equation.

FIG. 24 is a view showing a contact part model of the clinical thermometer when the heat flux is in a steady state, and the deep temperature computation equation. The top part of FIG. 24 shows the content of FIG. 4 of Patent Citation 1 substantially without modification. As shown at the top of FIG. 24, the two different heat fluxes (Q (s+t) and Qu1, and Q (s+t) and Qu2) are indicated by lines having different slopes. In each heat flux, Equations (D) and (E) as equations for computing the deep temperature Tcore are obtained as described above by the condition whereby the heat flux in the human body 2 and the heat flux in the temperature measurement parts 3A, 3B are equal.

Based on Equation (D) and Equation (E), the term {(Rs+Rt)/Ru0} can be removed. As a result, Equation (F) below is obtained as the deep temperature computation equation Tcore.

[Eq. 6]

$$Tcore = \frac{Tb3(Tb1 - Tb2) - Tb1(Tb3 - Tb4)}{(Tb1 - Tb2) - (Tb3 - Tb4)} \quad (F)$$

Through Equation (F), the deep temperature Tcore of the human body 2 can be calculated with good precision irrespective of the thermal resistance value in the human body 2.

Figure 25:
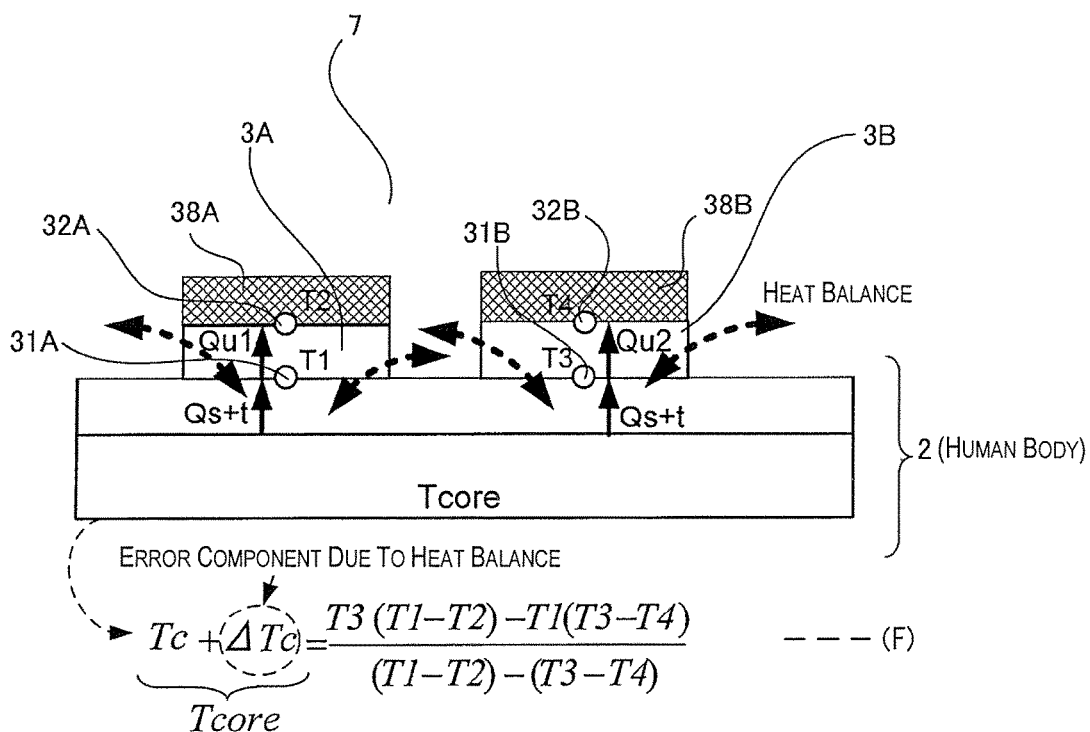
FIG. 25 is a view showing the measurement error due to a heat balance in the technique.

FIG. 25 shows the manner in which a measurement error due to a heat balance occurs in the technique shown in FIG. 23. In FIG. 25, the measurement temperatures of the body surface sensors 31A through 32B are indicated as T1 through T4 for the sake of convenience.

In FIG. 25, heat balances (transfers of heat) between the human body 2 and the environment (atmosphere in this case) 7, or between the temperature measurement parts 3A, 3B and the environment 7, are indicated by thick dashed-line arrows. As described above, a heat flux occurs from the deep part of the human body 2 to the temperature measurement parts 3A, 3B, but during actual temperature measurement, a portion of the heat flux escapes to the environment (atmosphere) 7 from the temperature measurement parts 3A, 3B, for example, and heat flows into the temperature measurement parts 3A, 3B from the environment (atmosphere) 7. In the technique described in Patent Citation 1 previously described, an ideal heat flux is assumed in which there is no heat balance, and the presence of a slight measurement error is therefore incontrovertible.

In Equation (F) shown at the bottom of FIG. 25, the deep temperature Tcore in the technique is divided into a true deep temperature Tc and an error component ΔTc due to heat balance. In other words, in the measurement method described in Patent Citation 1, a slight measurement error that accompanies a heat balance is present in the measured deep temperature Tcore. Removing this error component that accompanies a heat balance by corrective calculation or the like, for example, enablers the precision of measuring the deep temperature to be further enhanced.

Embodiments of the invention will next be described with reference to the drawings.

(First Embodiment)

FIGS. 1A through 1D are views showing the method for measuring a deep temperature in a first embodiment. In FIGS. 1A through 1D, only the relevant parts (temperature measurement parts) in the present embodiment are shown. An example of the overall configuration of the temperature measurement device is described hereinafter by using FIG. 9.

FIG. 1A will first be referenced. The temperature measurement device in the present embodiment has a substrate 40; a first temperature sensor 50 for measuring the temperature at a first measurement point p1 of the substrate 40 as a first temperature Tb; a second temperature sensor 52 for measuring the temperature at a second measurement point p2 of the substrate 40 different from the first measurement point p1 as a second temperature Tp; and a third temperature sensor 55 for measuring the temperature at a third measurement point p3 of the substrate 40 different from the first measurement point p1 and the second measurement point p2, as a third temperature Tout' which is a temperature substituted as the temperature of an environment 7 around the substrate 40.

The environment temperature Tout herein is temperature information obtained by measurement of the temperature of the environment (e.g., atmosphere) 7 around the substrate 40, for example, by an atmosphere temperature sensor 54 installed in the atmosphere, for example. In contrast, the environment equivalent temperature (third temperature) Tout' is temperature information used instead of the environment temperature Tout during calculation of the deep temperature, the environment equivalent temperature (third temperature) Tout being measured by the third temperature sensor 55 provided to the substrate 40, for example. As described above, the third temperature Tout is a temperature used instead of the environment temperature Tout during calculation of the deep temperature and is a concept distinct from the environment temperature Tout, but the third temperature Tout' is utilized as a temperature which corresponds to the environment temperature Tout in calculating the deep temperature. In other words, the third temperature Tout can be referred to as a temperature that corresponds to the temperature of the environment 7 around the substrate. The "third temperature" is therefore sometimes referred to as the "environment equivalent temperature" in the description given hereinafter. In the description given hereinafter, the environment temperature Tout and the third temperature Tout' are treated as distinct for the sake of accuracy in the description.

The substrate 40, the first temperature sensor 50, the second temperature sensor 52, and the third temperature sensor 55 are constituent elements of the temperature measurement part 43. The first measurement point p1, the second measurement point p2, and the third measurement point p3 may be positioned on an external surface of the substrate 40 or inside the substrate 40. In other words, the first measurement point p1, the second measurement point p2, and the third measurement point p3 are three arbitrary points positioned on the external surface of the substrate 40 or inside the substrate 40.

The first measurement point p1 is a measurement point on the measured body 6 side of the substrate 40, and the second measurement point p2 is a measurement point positioned on the environment 7 side. The third measurement point is a measurement point for measuring the environment equivalent temperature (third temperature) Tout' which corresponds to the temperature (environment temperature Tout) of the environment 7, as described above.

The substrate 40 has a first surface SR1 which is a contact surface for contacting a measured body 6; and a second surface SR2 which is opposite the first surface SR1 and is a surface on the environment 7 side (i.e., an upper surface of the substrate 40). The first surface SR1 of the substrate 40 is in contact with a surface of a surface layer part 5 of the measured body 6.

The second surface SR2 of the substrate 40 is a surface parallel to the first surface SR1, for example. The substrate 40 is a heating medium for transmitting heat. A material (e.g., silicone rubber) having a predetermined thermal conductivity (or thermal resistance), for example, may be used as the substrate 40. The measured body 6 may be a human body, or a furnace, duct, or other mechanical structure.

A type of temperature sensor which converts a temperature value to a resistance value, for example, may be used as the first temperature sensor 50, the second temperature sensor 52, and a third temperature sensor 55, or a type of temperature sensor which converts a temperature value to a voltage value may be used. A chip thermistor, a flexible substrate on which a thermistor pattern is printed, a platinum resistance thermometer, or the like may be employed as a type of temperature sensor which converts a temperature value to a resistance value. A thermocouple element, a PN junction element, a diode, or the like may be employed as a type of temperature sensor which converts a temperature value to a voltage value.

The deep temperature of a deep part 4 of the measured body 6 is designated as Tc, and the deep temperature Tc is the temperature to be measured. In the example shown in FIG. 1A, a heat flow (heat flux) Qa occurs from the deep part 4 of the measured body 6 to the environment 7, as indicated by the dashed-line arrow.

The environment 7 is an atmosphere or other heating medium, for example. The expression "environment" may also be rephrased as a "surrounding medium" or "environment medium." The medium can be referred to as the environment (surrounding medium, environment medium) 7 even in a case in which a gas component which is not a constituent component of the atmosphere is included in the medium surrounding the substrate 40. The medium is also not limited to being a gas.

The first temperature sensor 50 and the second temperature sensor 52 measure the first temperature Tb and the second temperature Tp a plurality of times (three times in the present embodiment) under conditions in which the temperature (environment temperature) Tout of the environment 7 varies. The third temperature sensor 55 measures the environment equivalent temperature (third temperature) Tout', the value of which varies according to the environment temperature Tout, a plurality of times (three times in the present embodiment).

Temperature information of the environment temperature Tout is necessary in order to calculate the deep temperature Tc, but in the present embodiment, the environment equivalent temperature Tout' is used in place of the environment temperature Tout. The reason for this is described below. Specifically, a separate temperature sensor (the atmosphere temperature sensor 54 shown in FIG. 1A) for measuring the environment temperature must be provided in the environment 7 outside the substrate 40 in order to directly measure the environment temperature Tout. When the environment equivalent temperature Tout' is instead measured, the third temperature sensor 55 can be provided inside or on an external surface of the substrate 40, and as a result, the three sensors (first temperature sensor 50, second temperature sensor 52, and third temperature sensor 55) can be consolidated in the substrate 40, and the size of the temperature measurement device can be further reduced. The configuration in which the environment equivalent temperature Tout' is used in place of the environment temperature Tout is used for the sake of further reducing the size of the temperature measurement device.

Ideally, the environment temperature Tout and the third temperature (environment equivalent temperature) Tout' are such that Tout=Tout', but in actual practice, since the third temperature (environment equivalent temperature) Tout' is not only affected by the environment temperature, but also by heat flows which occur between the measured body and the environment, Tout and Tout' are usually not equal.

However, in the deep temperature calculation equation used in the present aspect, the correlation between the measured plurality of temperature data is important, rather than the absolute value of the measured values, and when the correlation is satisfied, using the third temperature Tout' in place of the environment temperature Tout has no effect on the measurement precision as such.

The correlation described above is a correlation whereby the same linearity is maintained even when the third temperature Tout' is used in place of the environment temperature Tout when the first temperature Tb and the second temperature Tp are linear with respect to the environment temperature Tout, for example. Since the temperature of any one point in the substrate can be expressed by a linear function which includes the environment temperature Tout as a variable, the third temperature Tout' is also linear with respect to the environment temperature Tout, and when the environment temperature Tout is determined, the third temperature Tout' is also unambiguously determined by a linear function. Therefore, a linear function established between the environment temperature Tout and the first temperature Tb and second temperature Tp can be considered to be established in the same manner between the third temperature Tout' and the first temperature Tb and second temperature Tp. For such a reason, high measurement precision can be maintained even when the third temperature Tout' is used in place of the environment temperature Tout.

The deep temperature Tc of the measured body can be obtained basically by calculation using the measured values obtained by a plurality of temperature measurements, on the basis of the relationship established between the environment temperature Tout and the first temperature Tb and second temperature Tp. As described above, since the same relationship is established even when the third temperature (environment equivalent temperature) Tout' is used in place of the environment temperature Tout, the expression "third temperature (environment equivalent temperature) Tout'" is used appropriately in the following description.

The temperature Tb (i.e., first temperature) of the first measurement point p1 and the temperature Tp (i.e., second temperature) of the second measurement point p2 both fluctuate due to the effects of the deep temperature Tc as a heat source, and fluctuate due to the effects of the temperature Tout of the environment 7, which is the terminal end of the heat flow.

For example, when the second temperature Tp is equal to $T_{P4}$, the first temperature Tb can be expressed as $aT_{P4}+b$, where a is the slope (first slope) of a linear function, and b is the intercept (first intercept). The first intercept b varies linearly with respect to the environment temperature Tout, i.e., with respect to the third temperature Tout' which is the environment equivalent temperature. Specifically, b=cTout+d, where c is the slope (second slope) of a linear function, and d is the intercept (second intercept).

A calculation part (not shown in FIGS. 1A through 1D; indicated by reference numeral 74 in FIGS. 3 through 5) included in the temperature measurement part calculates the deep temperature Tc in the deep part 4 of the measured body 6, the deep part 4 being distant from the first surface SR1, by calculation by a first computation equation (Equation (1)) which is a deep temperature calculation equation, on the basis of the first temperatures (Tb1 through Tb3) and second temperatures (Tp1 through Tp3) obtained by three measurements, and the third temperatures (Tout1' through Tout3') having different values and corresponding to the three measurements. In other words, Tc=d/(1−a−c).

The first computation equation (Equation (1)) is derived with attention to the fact that the heat balance is zero when the deep temperature Tc and the environment temperature Tout (i.e., the environment equivalent temperature Tout') are equal (the detailed derivation is described hereinafter). The constants a, c, and d are determined from the temperature data obtained by the three measurements, and the deep temperature Tc is calculated by substituting the constants into Equation (1). Equation (1) is referred to hereinafter as the first computation equation. The deep temperature Tc is computed by this method in the present embodiment.

The first computation equation (Equation (1)) is derived by a compensation calculation under conditions in which the environment temperature Tout (environment equivalent temperature Tout') is equal to the deep temperature Tc. In other words, since Tout (Tout')=Tc according to the assumed conditions in the compensation calculation equation, the fact that the environment equivalent temperature Tout' that is actually measured differs somewhat from the environment temperature Tout does not significantly affect the compensation calculation.

However, since the temperature distribution in the substrate 40 is assumed to be linear with respect to the environment temperature Tout in the first computation equation, in a case in which there is a large difference between the actual environment temperature Tout and the value of the environment temperature Tout' used in the calculation, the assumption that the temperature distribution in the substrate 40 is linear with respect to the environment temperature Tout may no longer be satisfied, and an error occurs in the deep temperature measurement results in this case. Measures are therefore preferably taken to ensure that the difference (error) between the environment equivalent temperature Tout' and the environment temperature Tout is small.

In the technique, different types of heat insulators are used in two temperature measurement parts to generate two different heat fluxes under conditions in which the environment temperature is constant, but in the present embodiment, a heat flux is generated in at least two systems in which the environment temperature varies. The term "environment" is used in the following description, but the "environment" is an atmosphere or other heating medium, for example, and can also be referred to as a surrounding medium or an environment medium.

In the heat flow model of the technique, the environment temperatures Tout in the two temperature measurement systems have the same value (i.e., are constant). The heat flow that occurs between the deep temperature Tc and the environment temperature Tout in each system is thereby constant, and this condition is assumed in the technique. The condition that the heat flow from the measured body to the environment, e.g., in the vertical direction, is constant is established under the assumption that no heat balance occurs in which a portion of the heat flow in the vertical direction escapes to the environment via a side surface of the substrate, for example.

However, as the temperature measurement device is further reduced in size, and the size of the substrate decreases, a heat balance (e.g., an escape of heat from a side surface of the substrate) between the measured body and the environment is manifested. In this case, the assumption of a constant heat flow between the deep temperature Tc and the environment temperature Tout is no longer satisfied.

In the present embodiment, however, one end of each heat flow in the plurality of heat flow systems is an environment 7 in which temperature fluctuation is allowed. For example, the environment temperature is Tout1 (an arbitrary temperature) in the first system, and the environment temperature is Tout2 (an arbitrary temperature different from Tout1) in the second system. The present embodiment is thereby not subject to the limitation of the technique, in which the heat flow between the environment temperature (Tout) and the deep temperature (Tc) must be constant between the plurality of heat flow systems. In other words, the movement of heat due to the heat balance is inherently included in the heat flux of each system, and between the environment temperature Tout (arbitrary temperature) and the deep temperature Tc of the measured body, there is only a heat flow which also includes also the heat balance component.

In a heat flow system such as described above, the temperature of any two points (first measurement point and second measurement point) in the substrate can be expressed by an equation which includes the environment temperature Tout, i.e. the third temperature Tout' which is an environmental equivalent temperature, as a variable (parameter).

When the deep temperature Tc and the environment temperature Tout (in other words, the third temperature Tout') are equal, the heat balance is zero. Therefore, when calculating the deep temperature Tc, for example, the measurement error due to heat balance can be reduced to zero by imparting the condition that the deep temperature Tc and the environment temperature Tout are equal.

An example will next be described of the method for determining which of three arbitrary points positioned in the substrate 40 to designate as the first measurement point p1, the second measurement point p2, or the third measurement point p3. Diverse variations are possible for the position (position of the first temperature sensor 50) of the first measurement point p1, the position (position of the second temperature sensor 52) of the second measurement point p2, and the position (position of the third temperature sensor 55) of the third measurement point p3. FIG. 1B will next be referenced.

As described above, the first measurement point p1, second measurement point p2, and third measurement point p3 may be positioned on a surface or lateral surface of the substrate 40, i.e., on the external surface of the substrate 40, or may be positioned inside the substrate 40. The first measurement point p1, second measurement point p2, and third measurement point p3 herein are always in different positions.

In the example shown in FIG. 1B, three points (point a, point b, point c) are set inside the substrate 40. Since the third measurement point p3 herein is the measurement point for measuring the environment equivalent temperature Tout' which corresponds to the environment temperature Tout, the point (point most affected by the environment temperature Tout) at which heat exchange with the environment 7 occurs most easily among the three points (point a through point c) is preferably selected to be the third measurement point. In other words, the measurement point at which the value of the smallest thermal resistance with respect to the environment 7 is smaller than that of the other two points is preferably designated as the third measurement point.

In FIG. 1B, the shortest distances to the environment 7 from the three measurement points a through c are L1, L2, and L3, where L1, L2, and L3 are values equal to or greater than zero, and in the example shown in FIG. 1B, L2 L3 L1. In other words, L2 is the smallest. Measurement point b is therefore the point at which heat exchange with the environment 7 occurs most easily. Consequently, in the example shown in FIG. 1B, measurement point b is the third measurement point p3 for measuring the environment equivalent temperature Tout'.

The determination of which of the remaining two points (measurement point a and measurement point c) to designate as the first measurement point p1 will next be described. Since the first measurement point p1 is the measurement point on the measured body 6 side, the measurement point that is closer to the measured body 6, i.e., the measurement point that is closer to the deep part 4 of the measured body 6 as the heat source, is preferably designated as the first measurement point p1.

Therefore, in FIG. 1B, referring to the distance from the first surface (contact surface) SR1 in the direction of a normal line perpendicular to the first surface SR1 of the substrate 40, the distance of point a is LA, the distance of point b is LB, and the distance of point c is LC. The height of the substrate 40 (distance from the first surface SR1 to the second surface SR2) is designated as LD. In the example shown in FIG. 1B, LA<LB<LC, and LA is the smallest.

In other words, the measurement point a is positioned closer to the measured body 6 than the measurement point c. Consequently, in the example shown in FIG. 1B, the measurement point a is the measurement point p1 on the measured body 6 side. As a result, the third measurement point c is the second measurement point p2, which is the measurement point on the environment side. The first measurement point p1 through third measurement point p3 can thus be determined for any three points positioned in the substrate 40. However, this determination method is merely an example, and is not limiting.

The positional relationship between the first measurement point p1 and the second measurement point p2 will next be described with reference to FIG. 1C. The results of measuring the deep temperature using diverse variations of the first measurement point p1 and the second measurement point p2 will be described hereinafter by using FIGS. 13 through 18.

As described above, the first measurement point p1 is the measurement point on the measured body 6 side, and the second measurement point p2 is the measurement point on the environment (atmosphere) 7 side. As shown in FIG. 1C, referring to the distance from the first surface (contact surface) SR1 in the direction of a normal line perpendicular to the first surface SR1 of the substrate 40, the distance of the first measurement point p1 is designated as LA, and the distance of the second measurement point p2 is designated as LB. The height of the substrate 40 is designated as LC, and the height (distance from the first surface SR1 to the second surface SR2) of the substrate 40 is designated as LD.

As for the distance LA and the distance LB, 0≤LA, LB≤LC, and LA≤LB. In other words, the distances LA, LB of the first measurement point p1 and the second measurement point p2 from the first surface SR1 of the substrate 40 are 0 or greater, and the height (height at the top) of the substrate 40 is within LC. When the distance LA of the first measurement point p1 from the first surface SR1 of the substrate 40, and the distance LB of the second measurement point p2 from the first surface of the substrate 40 are compared, LA may be less than LB, and LA may be equal to LB.

When LA<LB, the first measurement point p1 is positioned closer to the measured body 6 than the second measurement point p2. When LA=LB, the first measurement point p1 and the second measurement point p2 are on a horizontal line, and the distances thereof are equal with respect to the direction of the normal line perpendicular to the first surface SR1. In this case, when there is a difference in relation to the distance (i.e., the distance to the lateral surface of the substrate 40) in the direction parallel to the first surface SRI, the second measurement point p2, which is the measurement point on the environment 7 side, may be the point for which the distance to the lateral surface of the substrate 40 is smaller. The capability of accurately measuring the deep temperature Tc even when LA=TB will be described hereinafter using FIG. 16.

A case in which the arbitrary free points (a through c) are positioned on a horizontal line in the substrate will be described with reference to FIG. 1D. In the example shown in FIG. 1D, LA=LB=LC, and the distances of the points a through c are equal in the normal line direction perpendicular to the first surface SR1. However, the relation L5<L6<L4 is established for the distances (i.e., distances to the lateral surface of the substrate 40) L4 through L6 in the direction parallel to the first surface SR1.

Consequently, the point b most affected by the environment temperature Tout can be designated as the third measurement point for measuring the environment equivalent temperature Tout'. As for point a and point c, since point c is positioned closer to the environment 7 than point a, point c may be designated as the second measurement point p2 for measuring the temperature (second temperature Tp) of the environment side. As a result, point a becomes the first measurement point p1, which is the measurement point on the measured body 6 side.

When three arbitrary points are set in the substrate 40, the first measurement point p 1 through third measurement point p3 can be determined by considering the distance thereof from the measured body 6 to each point, and the distance thereof from the environment 7 to each point.

An example of the method for providing a temperature sensor to the substrate 40 will next be described. FIGS. 2A through 2E are views showing an example of the method for providing a temperature sensor to the substrate. The first temperature sensor 50 (composed of a thermocouple element, for example) will be described as an example. The method described below can be applied in the same manner to the second temperature sensor 52 and the third temperature sensor 55.

Figure 2A:
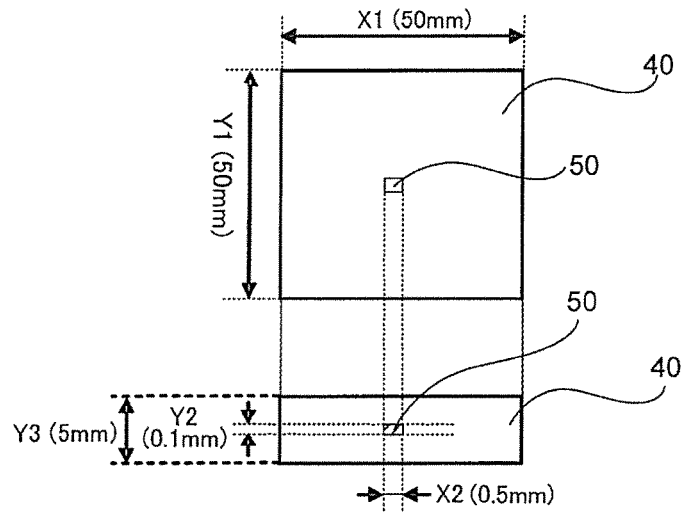
FIGS. 2A through 2E are views showing an example of a method for providing a temperature sensor to a substrate.

FIG. 2A shows a plan view and a sectional view of the substrate 40 (including the first temperature sensor 50). As shown in the plan view, the substrate 40 has a square shape in plan view, and the longitudinal Y1 and transverse X1 sides thereof are both 50 mm, for example. As shown in the sectional view, the height Y3 of the substrate is 5 mm, for example. The first temperature sensor 50 is embedded in the substrate 40. The transverse side X2 of the first temperature sensor 50 is 0.5 mm, for example, and the longitudinal (height) side Y2 thereof is 0.5 mm, for example. Foam rubber (e.g., natural latex rubber) or foam resin (e.g., urethane foam), for example, may be used as the substrate 40.

Figure 2B:
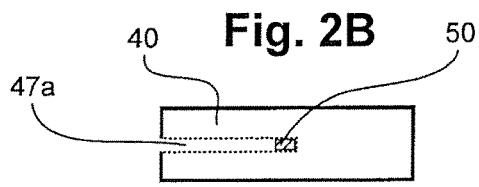
Figure 2C:
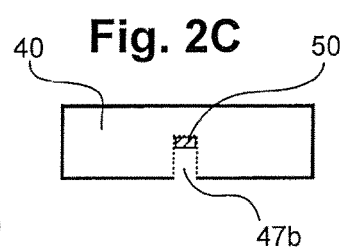

FIGS. 2B and 2C show an example of the method for embedding the first temperature sensor 50 in the substrate 40. In FIG. 2B, a tunnel 47a is formed from a lateral surface of the substrate 40 toward the center thereof, the first temperature sensor 50 is conveyed to the inside of the substrate 40 through the tunnel 47a, and the first temperature sensor 50 is provided substantially in the center of the substrate 40.

In the example shown in FIG. 2C, a pit 47b is formed instead of the tunnel 47a in FIG. 2B.

Figure 2D:
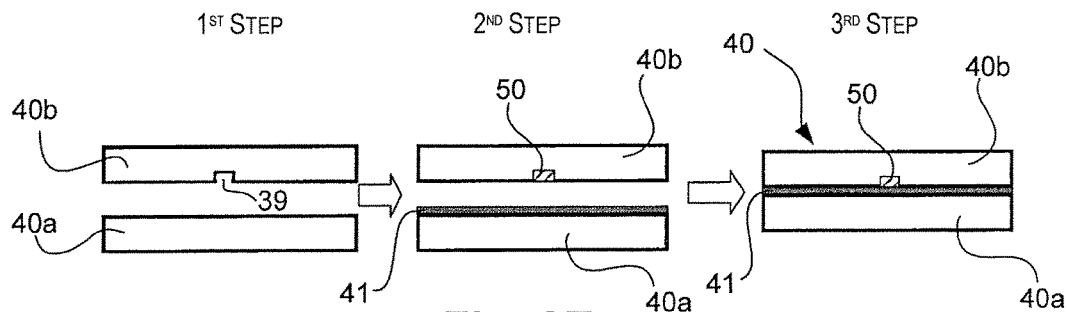
Figure 2E:
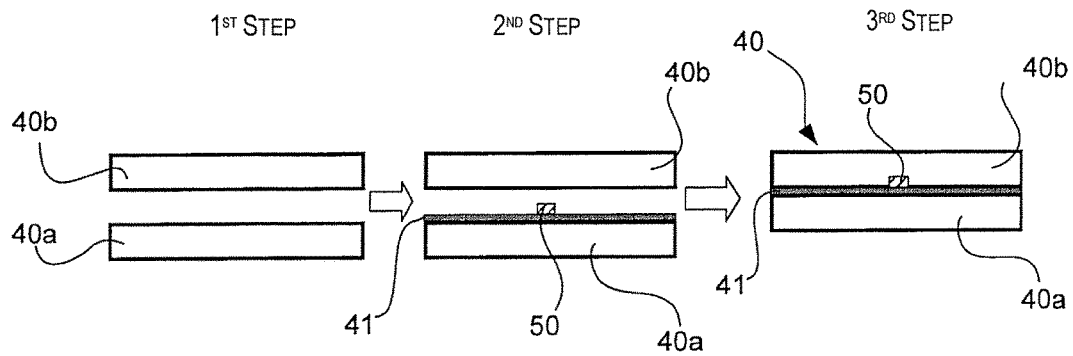

FIGS. 2D and 2E show another example of the method for embedding the first temperature sensor 50 in the substrate 40. In the example shown in FIGS. 2D and 2E, the substrate 40 is divided into a lower portion 40a and an upper portion 40b. When the lower portion 40a and the upper portion 40b are bonded together, the first temperature sensor 50 is held between the two portions 40a, 40b, and the first temperature sensor 50 can thereby be positioned inside the substrate 40.

In the first step of the example shown in FIG. 2D, a concave part 39 is formed in a portion of the upper portion 40b of the substrate 40. In the second step, the first temperature sensor 50 is embedded in the concave part 39 formed in the upper portion 40b of the substrate 40, and an adhesive 41 is formed on the surface of the lower portion 40a of the substrate 40 that is opposite the upper portion 40b. In the third step, the lower portion 40a and the upper portion 40b of the substrate 40 are bonded together. However, since foam rubber or foam resin is flexible, the first temperature sensor 50 may be directly held by the lower portion 40a and upper portion 40b of the substrate 40 without providing the concave part 39. An example of this configuration is shown in FIG. 2E.

In the first step of the example shown in FIG. 2E, a concave part is not formed in the lower portion 40a of the substrate 40. In the second step, the adhesive 41 is formed on the surface of the lower portion 40a of the substrate 40 that is opposite the upper portion 40b, and the first temperature sensor 50 is mounted on the adhesive 41. In the third step, the lower portion 40a and upper portion 40b of the substrate 40 are bonded together. The substrate 40 is composed of a soft material. The center part of the upper portion 40b of the substrate 40 deforms so as to envelop the first temperature sensor 50 when the components are bonded together. The example described above is merely an example, and the invention is not limited to these methods.

An example will next be described of a measurement method for ensuring that "the first temperature Tb, the second temperature Tp, and the third temperature (environment equivalent temperature) Tout are measured a plurality of times under conditions in which the value of the environment temperature Tout varies."

Figure 3A:
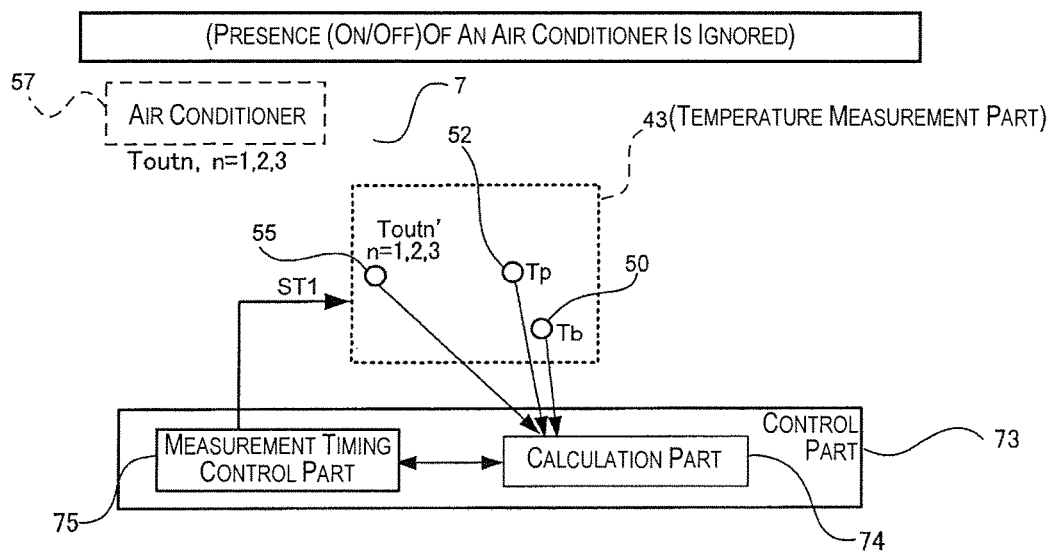
FIG. 3A and 3B are views showing an example of the temperature measurement method, and an example of the configuration of the temperature measurement device for implementing the temperature measurement method.
Figure 3B:
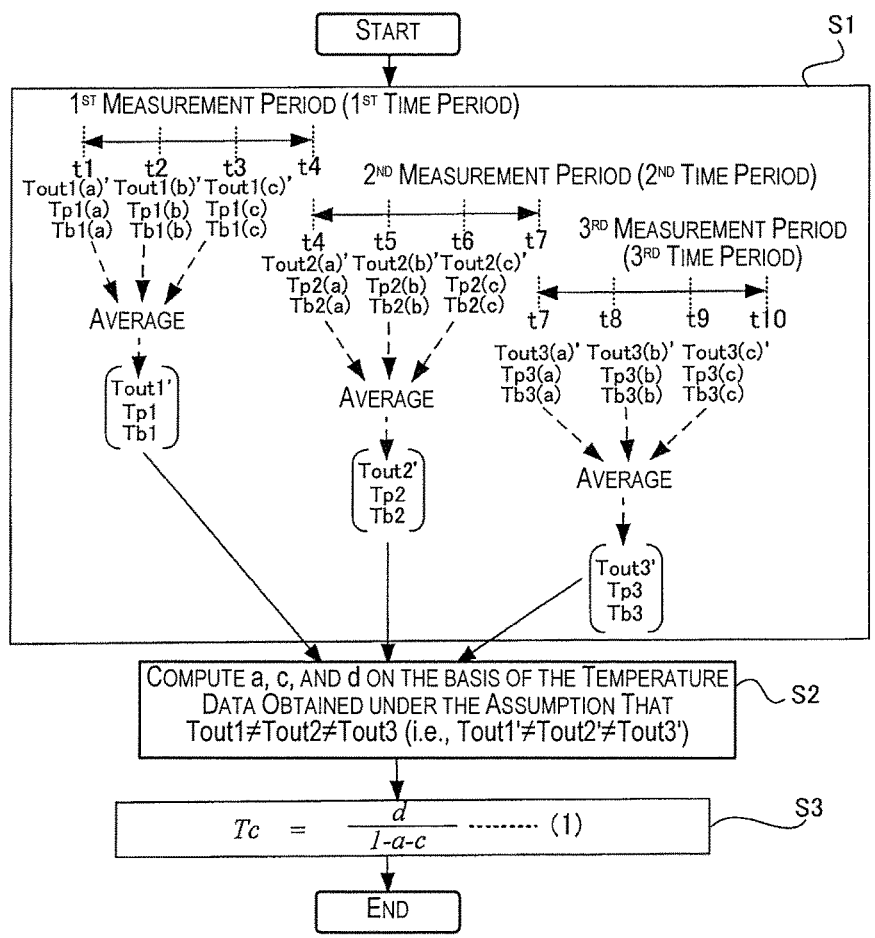

FIGS. 3A and 3B are views showing an example of the temperature measurement method, and an example of the configuration of the temperature measurement device for implementing the temperature measurement method.

The temperature measurement device shown in FIG. 3A includes a temperature measurement part 43, a calculation part 74, and a control part 73 for controlling the operation of the temperature measurement part 43 and the calculation part 74. The control part 73 has a measurement timing control part 75 in addition to the calculation part 74. The measurement timing control part 75 outputs a timing control signal TS1, and the measurement timing of the first temperature Tb, second temperature Tp, and third temperature (environment equivalent temperature) Tout3' by the first temperature sensor 50, the second temperature sensor 52, and the third temperature sensor 55 is varied according to the timing control signal TSST1.

The temperature of the environment 7 may be controlled by an air conditioner 57. However, since minute surges in the temperature of the environment 7 are utilized in the example shown in FIG. 4A, the presence (or on/off state of the air conditioner) of the air conditioner 57 is not an issue in the present example.

As shown in FIG. 3B, a first measurement period through third measurement period are provided for obtaining the first temperature Tb, the second temperature Tp, and the third temperature Tout'. The control part 73 executes a plurality of temperature measurements or acquisitions of temperature information in each measurement period, executes calculation by the first computation equation (Equation (1)) on the basis of the obtained data, and calculates the deep temperature Tc.

Methods for "varying the value of the environment temperature Tout" include active methods using an air conditioner or the like, and passive methods which focus on surges (minute fluctuations) in the environment temperature on a time axis to adjust the measurement timing. In the example shown in FIG. 3, the latter type of passive method is used.

For example, when the first temperature Tb at the first measurement point p1 of the substrate 40, and the second temperature Tp at the second measurement point p2 of the substrate 40 are measured three times, it is sometimes impossible to satisfy the condition of measuring three times in different environment temperatures when the time interval between the each measurement is very short. Therefore, in this example, a first time period (i.e., first measurement period) for the first measurement, a second time period (i.e., second measurement period) for the second measurement, and a third time period (i.e., third measurement period) for the third measurement are provided.

Each time period (measurement period) may be one minute (making a total of three minutes for the three time periods), for example. The first time period (first measurement period) is the period from time t1 to time t4, and temperature measurement is executed every 20 seconds, for example. In other words, three temperature measurements are executed at time t1, time t2, and time t3, and nine units of data such as are shown in the drawing are obtained. Temperature measurement values (Tb1, Tp1, Tout1') of the first measurement are determined by averaging (simple arithmetic mean or weighted average) the data.

Three temperature measurements are executed in the second time period (second measurement period) as well, and the temperature measurement values (Tb2, Tp2, Tout2') of the second measurement are determined by averaging (simple arithmetic mean or weighted average) the measurement results.

Three temperature measurements are executed in the third time period (third measurement period) as well, and the temperature measurement values (Tb3, Tp3, Tout3') of the third measurement are determined by averaging (simple arithmetic mean or weighted average) the measurement results. The processing described above is the processing of a first step S1. The term "averaging" is interpreted in the broadest sense.

In the next step S2, the constants a, c, and d shown in FIG. 1A are computed based on the obtained data. The deep temperature Tc is then measured based on the first computation equation (Equation (1)) in step S3.

In the example shown in FIG. 3, a plurality of temperature data for the first temperature Tb, the second temperature Tp, and the third temperature Tout measured in different environment temperatures Tout (i.e., in different environment equivalent temperatures Tout') can be obtained relatively easily without using an air conditioner or the like to actively vary the temperature of the environment.

Figure 4A:
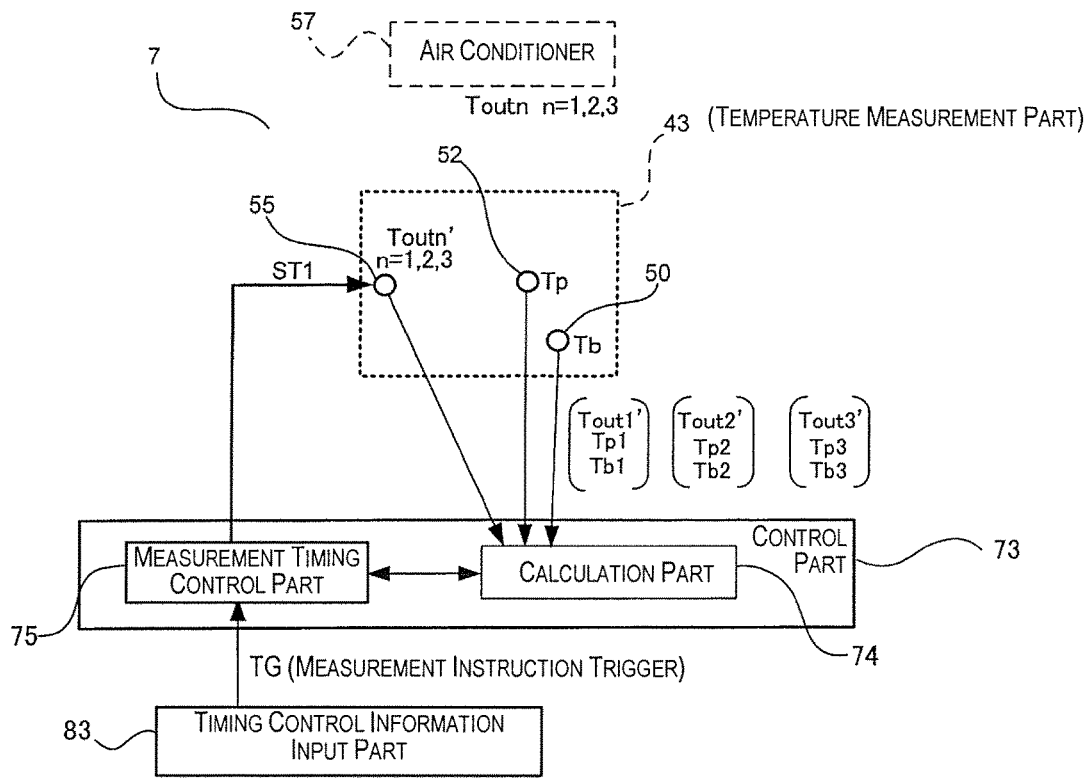
FIGS. 4A and 4B are views showing another example of the temperature measurement method, and another example of the configuration of the temperature measurement device for implementing the temperature measurement method.
Figure 4B:
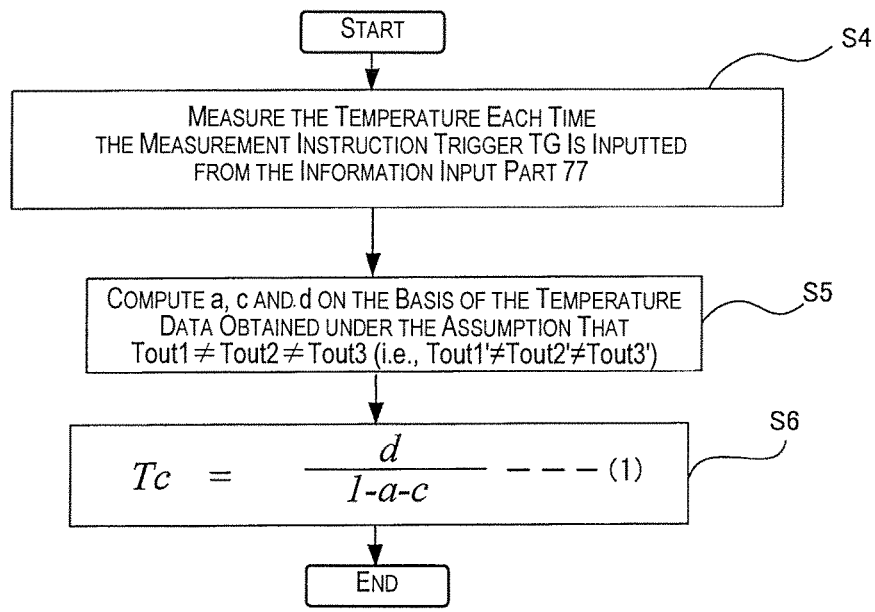

FIG. 4A and FIG. 4B are views showing another example of the temperature measurement method, and another example of the configuration of the temperature measurement device for implementing the temperature measurement method. In the temperature measurement device shown in FIG. 4A, a timing control information input part 83 for inputting timing control information is provided for determining the timing for executing a plurality of temperature measurements. The control part 73 causes the first temperature sensor 50, the second temperature sensor 52, and the third temperature sensor 55, for example, to execute temperature measurement each time the timing control information (measurement instruction trigger TG herein) is inputted from the timing control information input part 83.

In the example shown in FIG. 4, the user ensures by the user's own action that "the value of the third temperature (environment temperature Tout) is varied."

For example, the user sets the temperature of the external air conditioner 57 provided outside the temperature measurement device to a first temperature when the first measurement is performed, and when a predetermined time elapses from this setting, the measurement instruction trigger TG as the timing control information is inputted via the timing control information input part. As described above, the control part 73 causes the first temperature sensor 50, the second temperature sensor 52, and the third temperature sensor 55 to execute temperature measurement each time the timing control information is inputted from the timing control information input part 83. The measurement timing is controlled by the measurement timing control part 75.

Temperature measurement can be performed once each time the timing control information (measurement instruction trigger TG) is inputted, or a plurality of temperature measurements may be executed each time the timing control information is inputted, and the measurement values may be calculated by such a procedure as averaging the obtained measurement values. The user then inputs timing control information after setting the temperature of the air conditioner 57 to a second temperature, and inputs timing control information after setting the temperature of the air conditioner 57 to a third temperature. For example, the user inputs timing control information three times.

When the third set of temperature information is acquired, the calculation part 74 automatically executes calculation (calculation based on the computation equation) for calculating the deep temperature Tc, the calculation being based on the acquired temperature information, and as a result, the deep temperature Tc is calculated. The calculated deep temperature Tc is reported (by display, sound notification, or the like) to the user, for example. In the example shown in FIG. 3, since the user utilizes the air conditioner or the like to vary the environment temperature at each measurement, the temperature measurement device is not burdened with managing the environment temperature.

The measurement procedure is as described in steps S4 through S6 of FIG. 4B. The example described above is merely an example.

Figure 5A:
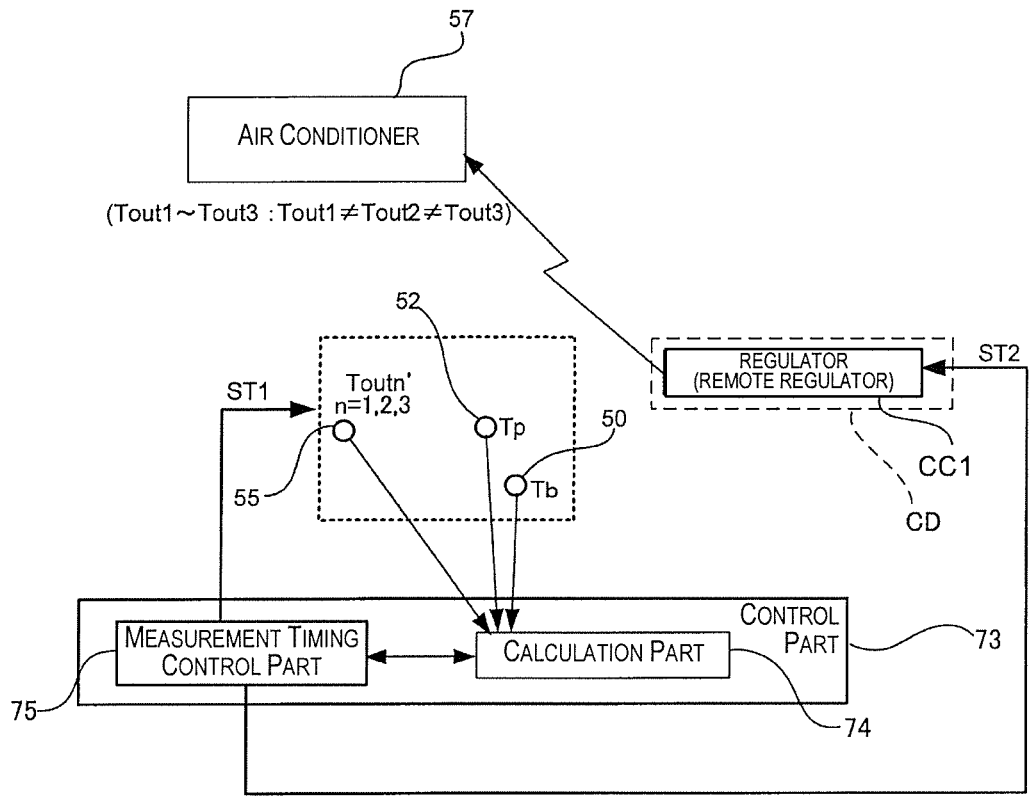
FIGS. 5A and 5B are views showing the relationship between the first temperature and the second temperature under conditions in which the environment temperature is constant, and the results in a case in which the relationship is applied to the deep temperature computation equation.
Figure 5B:
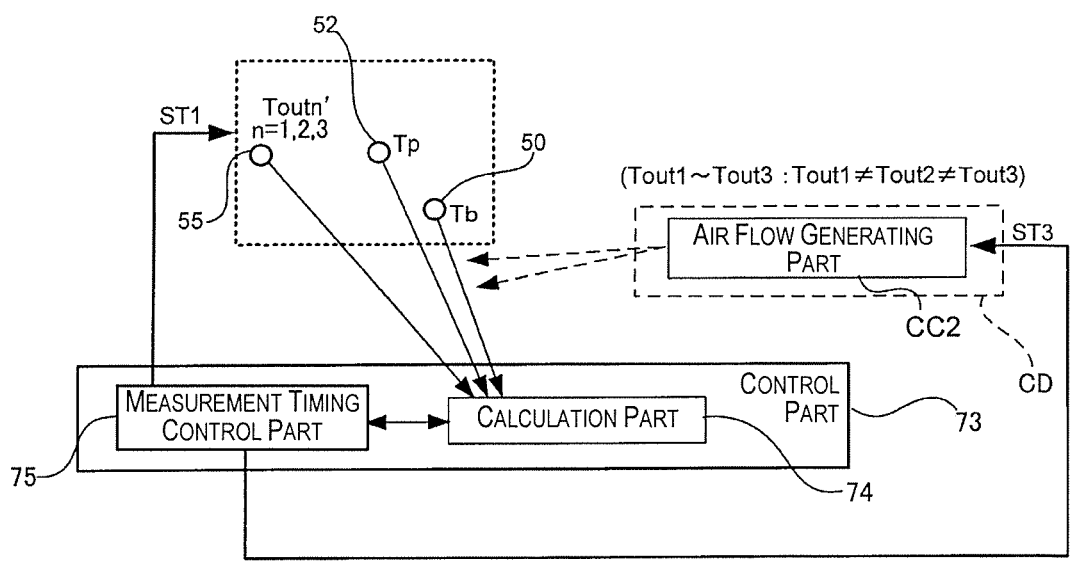

FIGS. 5A and 5B are views showing another example of the temperature measurement method, and another example of the configuration of the temperature measurement device for implementing the temperature measurement method. In the example shown in FIG. 5, the temperature measurement part has an environment temperature adjustment part CD capable of varying the environment temperature Tout. The control part 73 varies the environment temperature Tout through the use of the environment temperature adjustment part CD each time a single temperature measurement ends. Through this configuration, the relationship Tout1 Tout2 Tout3 is established.

In the example shown in FIG. 5A, a regulator CC1 having the function of adjusting the set temperature of the external air conditioner 57 by remote control, the air conditioner 57 being provided outside the temperature measurement device, for example, can be used as the environment temperature adjustment part CD. The operation of the regulator CC1 is controlled by a control signal ST2 from the measurement timing control part 75.

In the example shown in FIG. 5B, an air flow generating part (e.g., having the function of varying the temperature of an air flow) CC2 provided inside the temperature measurement device, for example, is used as the environment temperature adjustment part CD. The air flow generating part CC2 may be composed of a fan (electric fan), a minute nozzle for ejecting an air flow, or the like. The operation of the air flow generating part CC2 is controlled by a control signal ST3 from the measurement timing control part 75.

Through the use of the environment temperature adjustment part CD, the environment temperature Tout (and the environment equivalent temperature Tout') can be reliably varied for each measurement. The environment temperature Tout (and the environment equivalent temperature Tout') can also be set to an exact temperature. A large difference can also be set between the environment temperature Tout1 (and the environment equivalent temperature Tout') of the first measurement and the environment temperature Tout2 (and the environment equivalent temperature Tout') of the second measurement. The example described above is merely an example.

The first computation equation (calculation of the deep temperature Tc by using Equation (1) of FIG. 1A) will next be specifically described using FIGS. 6 through 8.

Figure 6A:
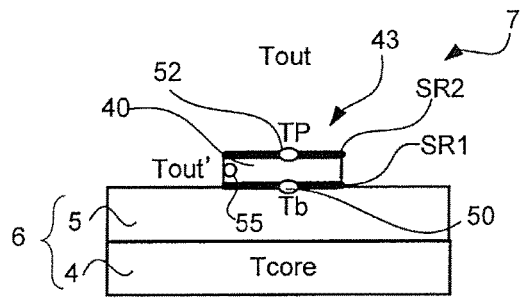
FIGS. 6A through 6C are views showing the relationship between the first temperature and the second temperature under conditions in which the environment temperature (and the third temperature) is constant, and the results in a case in which the relationship is applied to the deep temperature computation equation.
Figure 6B:
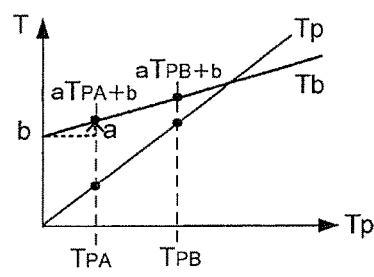
Figure 6C:
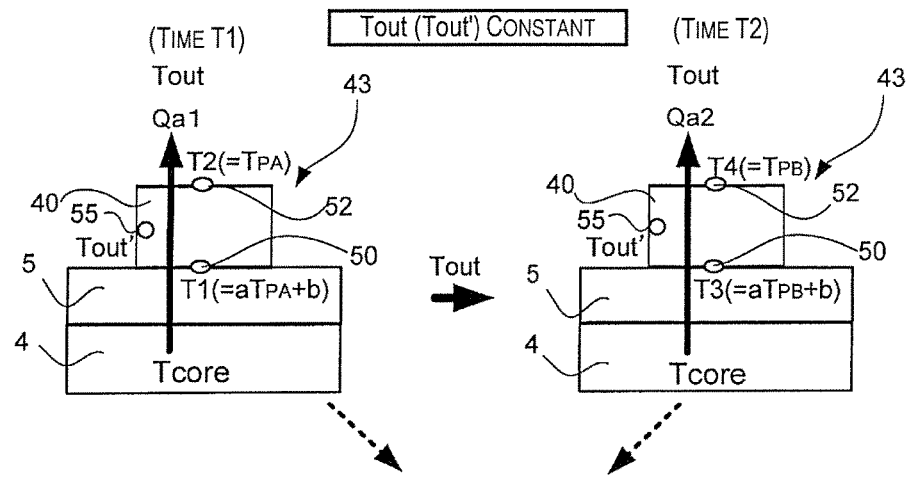

FIGS. 6A through 6C are views showing the relationship between the first temperature and the second temperature under conditions in which the environment temperature (and third temperature) is constant, and the results in a case in which the relationship is applied to the deep temperature computation equation.

In FIG. 6A, the first temperature sensor 50, the second temperature sensor 52, and the third temperature sensor 55 are provided to the substrate 40. The substrate 40, the first temperature sensor 50, the second temperature sensor 52, and the third temperature sensor 55 are constituent elements of the temperature measurement part 43. The substrate 40 has the first surface (contact surface) SR1 and the second surface (upper surface of the substrate 40) SR2. The temperature measurement part 43 is affixed, for example, to the measured body 6 (e.g., human body).

FIG. 6B is a view showing the relationship between the second temperature Tp and the first temperature Tb. In FIG. 6B, the horizontal axis is Tp, and the vertical axis is the temperature T of the second temperature Tp and the first temperature Tb. When the first temperature Tb varies linearly in a state in which the environment temperature (Tout) is constant, the second temperature Tp also varies linearly. In other words, the first temperature Tb is linear with respect to the second temperature Tp.

As shown in FIG. 6B, the first temperature Tb is expressed by a linear function in which the second temperature Tp is a variable. In other words, Equation (2) below is established.

[Eq. 7]

$$\left. \begin{array}{l} Tp = Tp \\ Tb = aTp + b \end{array} \right\} \quad (2)$$

In the above equation, a is the first slope and b is the first intercept (or first offset value), and a and b are both constants. When Tp is $T_{PA}$, Tb=$aT_{PA}$+b, and when Tp is $T_{PB}$, Tb=$aT_{PB}$+b.

FIG. 6C is a view showing the results in a case in which temperature data T1 through T4 obtained by two temperature measurements are applied to the deep temperature computation equation described above. A first temperature T1 and a second temperature T2 are obtained by temperature measurement at time t1. A first temperature T3 and a second temperature T4 are obtained by temperature measurement at time t2, and T1 through T4 are expressed by Equation (3) below.

[Eq. 8]

$$\left. \begin{array}{l} T_1 = aT_{PA} + b \\ T_2 = T_{PA} \\ T_3 = aT_{PB} + b \\ T_4 = T_{PB} \end{array} \right\} \quad (3)$$

The values in Equation (3) are substituted into Equation (4) (same as Equation (F) shown in FIG. 25). Equation (4) is a computation equation for calculating the deep temperature Tcore, but an error ΔTc due to a heat balance is included therein, as described above.

[Eq. 9]

$$Tc + \Delta Tc = \frac{T3(T1 - T2) - T1(T3 - T4)}{(T1 - T2) - (T3 - T4)} \quad (4)$$

Equation (5) is obtained as a result.

[Eq. 10]

$$\begin{aligned} T_c + \Delta T_c &= \frac{(aT_{PB} + b)[(aT_{PA} + b) - T_{PA}] -}{[(aT_{PA} + b)[(aT_{PB} + b) - T_{PB}]} \\ &= \frac{b}{1-a} \cdot \frac{T_{PA} - T_{PB}}{T_{PA} - T_{PB}} \\ &= \frac{b}{1-a} \end{aligned} \quad (5)$$

The relationship between the first temperature Tb and the second temperature Tp in a case in which the environment temperature Tout is varied, i.e., a case in which the environment equivalent temperature Tout' is varied will next be described with reference to FIG. 7. FIGS. 7A through 7D are views showing the relationship between the first temperature and the second temperature in a case in which the environment temperature (and the environment equivalent temperature) is varied, and are views showing the results in a case in which this relationship is applied to the deep temperature computation equation.

Figure 7A:
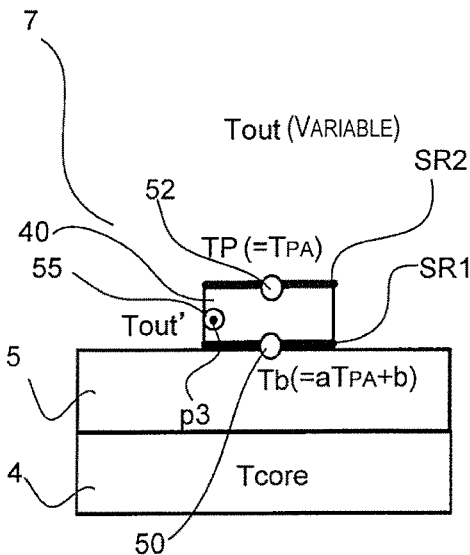
FIGS. 7A through 7D are views showing the relationship between the first temperature and the second temperature in a case in which the environment temperature (and the environment equivalent temperature) is varied, and the results in a case in which the relationship is applied to the deep temperature computation equation.

As shown in FIG. 7A, the fluctuating environment equivalent temperature (third temperature) Tout' is determined by the third temperature sensor 55. As previously described, when the second temperature Tp is $T_{P4}$, Tb=$aT_{P4}$+b. The constant b is the first intercept (first offset value), and this first intercept b is linear with respect to the environment equivalent temperature (third temperature) Tout'.

Figure 7B:
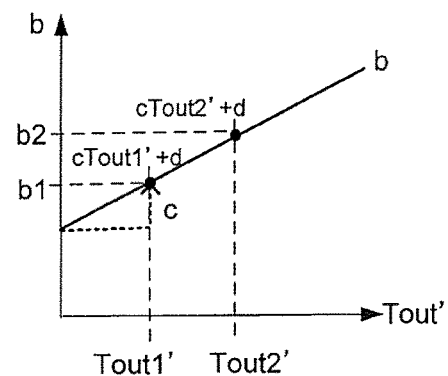

In other words, as shown in FIG. 7B, when the environment equivalent temperature (third temperature) Tout' fluctuates, the value of the first intercept b varies linearly in accordance with the environment equivalent temperature (third temperature) Tout'. The relationship of Equation (6) below is consequently established.

[Eq. 11]

$$b = cTout + d \quad (6)$$

In the above equation, c and d are both constants, c being the second slope, and d being the second intercept. When the environment equivalent temperature (third temperature) Tout' is Tout r, the first intercept b is b1 (=cTout1'+d), and when the environment equivalent temperature (third temperature) Tout' is Tout2', the first intercept b is b2 cTout2'+d).

Figure 7C:
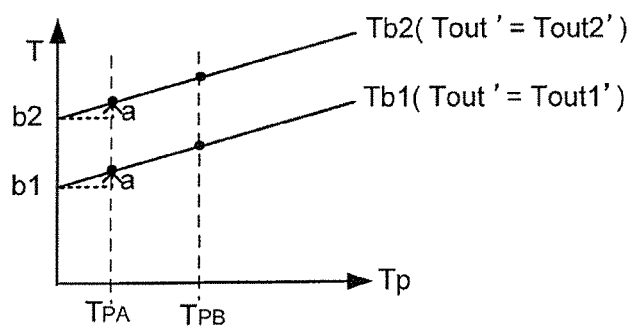
Figure 7D:
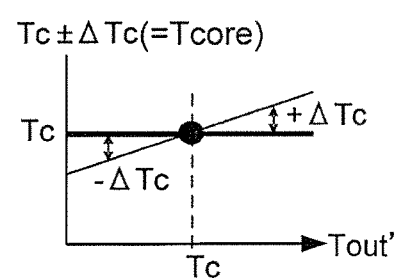

FIG. 7C shows the relationship between the second temperature Tp and the first temperature Tb (=Tb1) at Tout1', and shows the relationship between the second temperature Tp and the first temperature Tb (=Tb2) at Tout2'. When Tout' changes from Tout1' to Tout2', there is no variation in the slope (first slope a) of the linear function, but because the value of the first intercept b changes from b1 to b2, the linear function indicating the relationship between Tp and Tb is shifted in parallel fashion by an amount commensurate with the difference of b1 and b2.

The first temperature Tb thus has a linear relationship not only with respect to the second temperature Tp, but also with respect to the environment equivalent temperature (third temperature) Tout'. When Equation (6) above is substituted into the equation Tb=aTp+b shown in Equation (3) above, Equation (7) below is obtained.

[Eq. 12]

$$Tb = aTp + cTout + d \quad (7)$$

Equation (7) is a function including the second temperature Tp and the third temperature Tout' as variables, and including a plurality of constants a, b, and c. The first temperature Tb, second temperature Tp, and third temperature Tout' are related by this function.

When Equation (6) described above is substituted into Equation (5), Equation (8) is obtained.

[Eq. 13]

$$Tc + \Delta Tc = \frac{c}{1-a} Tout + \frac{d}{1-a} \quad (8)$$

Since a movement of heat is caused by the temperature difference herein, an error ΔTc due to a heat balance does not occur in a case in which the values of the environment temperature Tout (third temperature Tout') and the deep temperature Tc are equal. Thus, Tout'=ΔTc in Equation (8), and ΔTc=0. Equation (8) is therefore transformed into Equation (1).

[Eq. 14]

$$Tc = \frac{c}{1-a} Tc + \frac{d}{1-a} \quad (1)$$

$$Tc = \frac{d}{1-a-c}$$

This Equation (1) shows the deep temperature Tc not including an error due to heat balance. However, the values of the plurality of constants a, c, and d must be determined in order to solve Equation (1). The plurality of constants a, c, and d is related to each other by the function expressed by Equation (7) above. A ternary system of equations is solved in order to calculate the values of the three constants. At least three temperature measurements are therefore executed at different times.

In this arrangement, Tb1, Tp1, and Tout1' are obtained as the first temperature, the second temperature, and the third temperature, respectively, during the first measurement; Tb2, Tp2, and Tout2' are obtained as the first temperature, the second temperature, and the third temperature, respectively, during the second measurement; and Tb3, Tp3, and Tout3' are obtained as the first temperature, the second temperature, and the third temperature, respectively, during the third measurement.

These nine units of measurement data can be expressed by the determinant of Equation (9).

[Eq. 15]

$$\begin{pmatrix} Tb1 \\ Tb2 \\ Tb3 \end{pmatrix} = \begin{pmatrix} Tp1 & Tout1 & 1 \\ Tp2 & Tout2 & 1 \\ Tp3 & Tout3 & 1 \end{pmatrix} \begin{pmatrix} a \\ c \\ d \end{pmatrix} \quad (9)$$

The plurality of constants a, c, and d can thus be calculated by Equation (10) which includes the inverse matrix.

[Eq. 16]

$$\begin{pmatrix} a \\ c \\ d \end{pmatrix} = \begin{pmatrix} Tp1 & Tout1 & 1 \\ Tp2 & Tout2 & 1 \\ Tp3 & Tout3 & 1 \end{pmatrix}^{-1} \begin{pmatrix} Tb1 \\ Tb2 \\ Tb3 \end{pmatrix} \quad (10)$$

When the values of the plurality of constants are determined, the values are substituted into Equation (1). The deep temperature Tc is thereby obtained.

Figures 8A, 8B, 8C, 8D:
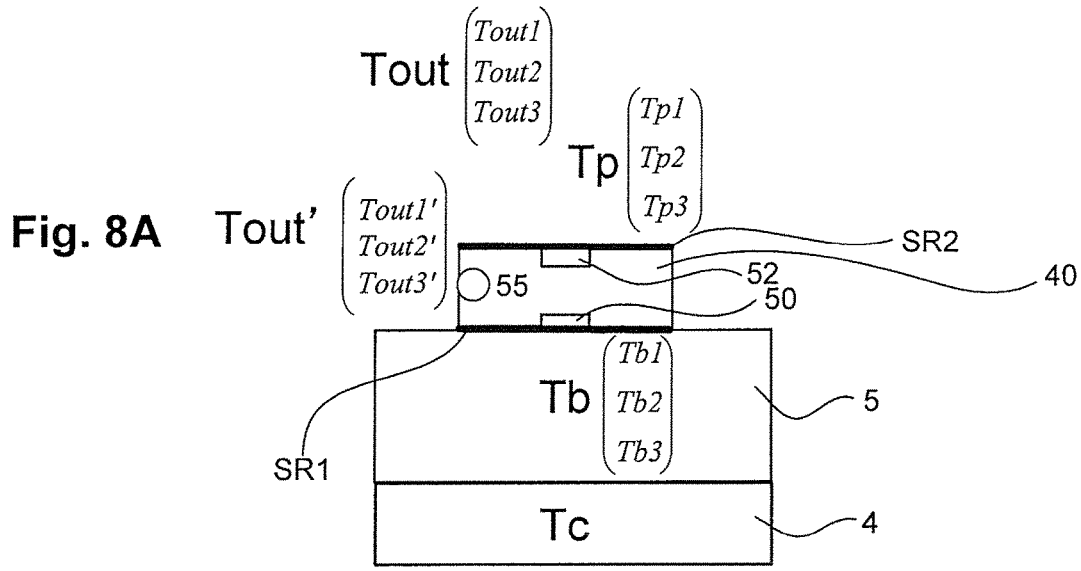
FIGS. 8A through 8D are views showing the method for measuring the deep temperature in the first embodiment.

FIGS. 8A through 8D are views showing the method for measuring the deep temperature in the first embodiment. As shown in FIG. 8A, the three temperatures, i.e., the first temperature Tb, the second temperature Tp, and the third temperature Tout', are measured at least three times. The nine units of measurement data thus obtained (Tb1, Tp1, Tout1', Tb2, Tp2, Tout2', Tb3, Tp3, Tout3') can be related by the determinant (9) shown in FIG. 8B. The plurality of constants a, c, and d can therefore be calculated by the determinant (10) shown in FIG. 8C. The deep temperature Tc can then be computed by Equation (1) shown in FIG. 8D.

Figure 9A:
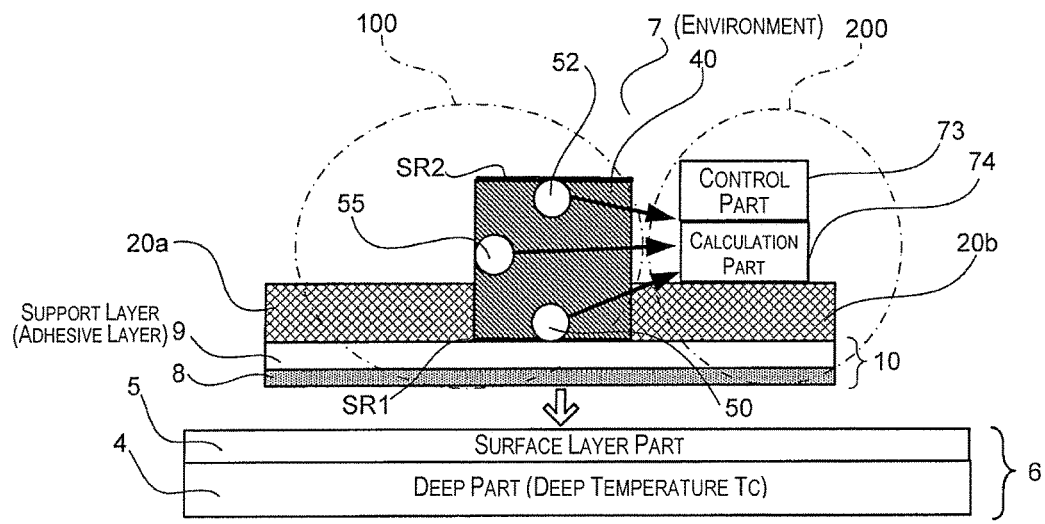
FIGS. 9A and 9B are views showing an example of the overall configuration of the temperature measurement device.
Figure 9B:
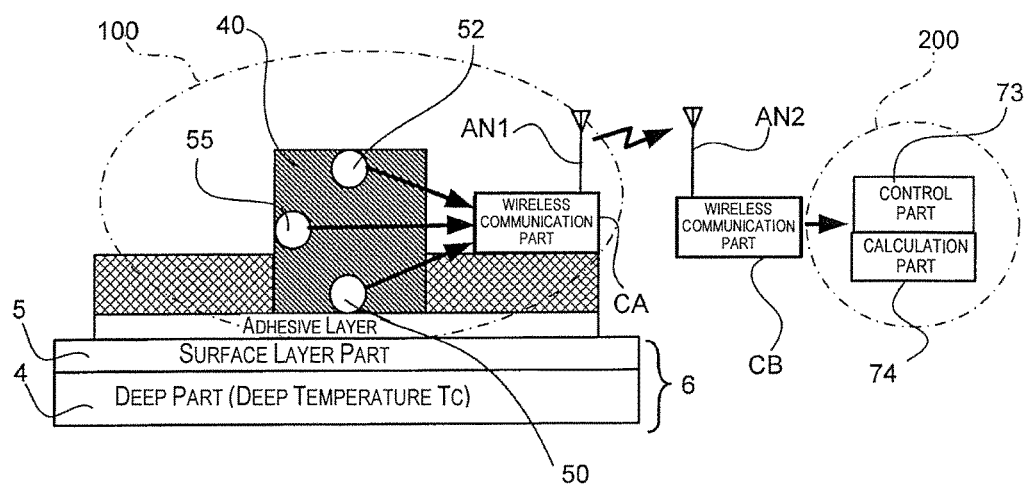

The overall configuration of the temperature measurement device will next be described. FIGS. 9A and 9B are views showing an example of the overall configuration of the temperature measurement device.

In the example shown in FIG. 9A, the first temperature sensor 50 and the second temperature sensor 52 are embedded inside the substrate 40. The third temperature sensor 55 is provided on a heat insulator 20a. The first temperature sensor 50, the second temperature sensor 52, the substrate 40, and the third temperature sensor 55 constitute a first unit 100.

A second unit 200 is also provided on a heat insulator 20b. The second unit 200 includes the control part 73 and the calculation part 74. The calculation part 74 may also include a constant computing part or a deep temperature computing part as a functional block. Although not shown in the drawing, a reporting part (e.g., display part) for reporting calculated results may also be provided to the second unit 200.

The temperature measurement device shown in FIG. 9A also has an affixing structure 10 for affixing the first surface (contact surface) SR1 in the substrate 40 to a surface of the measured body 6. The affixing structure 10 may be composed of an adhesive tape, for example. The adhesive tape may have a release paper 8 and a support layer (adhesive layer) 9.

The first unit 100 can be affixed to a surface of the measured body 6 by the affixing structure 10. Consequently, the operating properties and portability of the temperature measurement device are enhanced. In a case in which the temperature measurement device is used to measure the body temperature of a child or infant, for example, because of the frequent body movements of a child or infant, contact between the temperature measurement device and the body surface is difficult to satisfactorily maintain for a predetermined time. However, even in such a case, since the entire temperature measurement device can be affixed to the surface of the measured body 6 by using the affixing structure 10, contact between the body surface and the temperature measurement device can be satisfactorily maintained even as the body of the child or infant moves. Precise and stable temperature measurement is thereby possible.

In the example shown in FIG. 8C, a separate structure is employed in which the first unit 100 and the second unit 200 are separated. The first unit 100 includes the wireless communication part CA, and the second unit 200 includes the wireless communication part CB.

The information of the first temperature (Tb) and the information of the second temperature (Tp), or the information of the first temperature (Tb), the information of the second temperature (Tp), and the information of the third temperature (Tout), is transmitted from the wireless communication part CA to the wireless communication part CB. The calculation part 74 provided to the second unit executes calculation on the basis of the information of the first temperature (Tb) and the information of the second temperature (Tp), or the information of the first temperature (Tb), information of the second temperature (Tp), and information of the third temperature (Tout), received by the wireless communication part CB, and calculates the deep temperature Tc of the measured body 6.

Through the configuration shown in FIG. 9B, the number of constituent components of the first unit 100 (e.g., main body of the temperature measurement device) can be minimized, and the weight of the first unit 100 can be reduced. Consequently, a large burden is not placed on the subject even when the first unit 100 is in contact for a long time with the body surface of a subject as the measured body 6, for example. A temperature can thereby be continuously monitored for a long time, for example.

Since temperature data can be transmitted and received by wireless communication between the first unit 100 and the second unit 200, the second unit 200 can be placed somewhat distant from the first unit 100. Since wireless communication is utilized, there is no need for communication wires. The ease of handling of the first unit is thereby enhanced. Since the first unit 100 can also be completely separate from the second unit 200, the first unit 100 can be further reduced in weight.

Figure 10A:
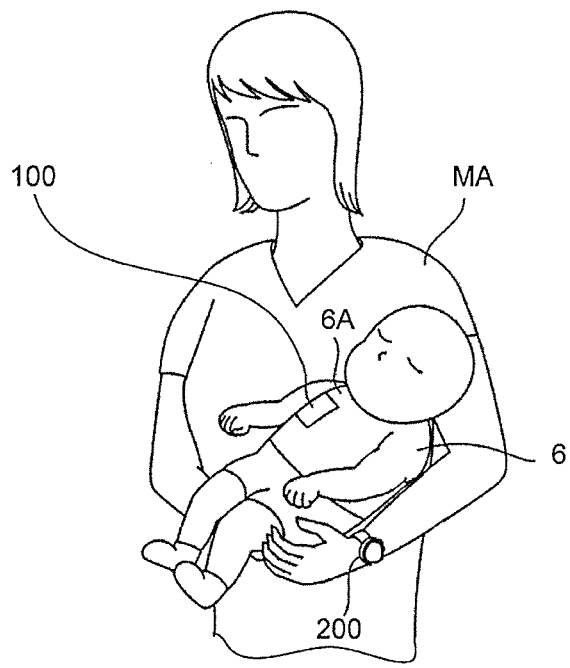
FIGS. 10A and 10B are views showing a practical example of the temperature measurement device in which wireless communication is utilized.
Figure 10B:
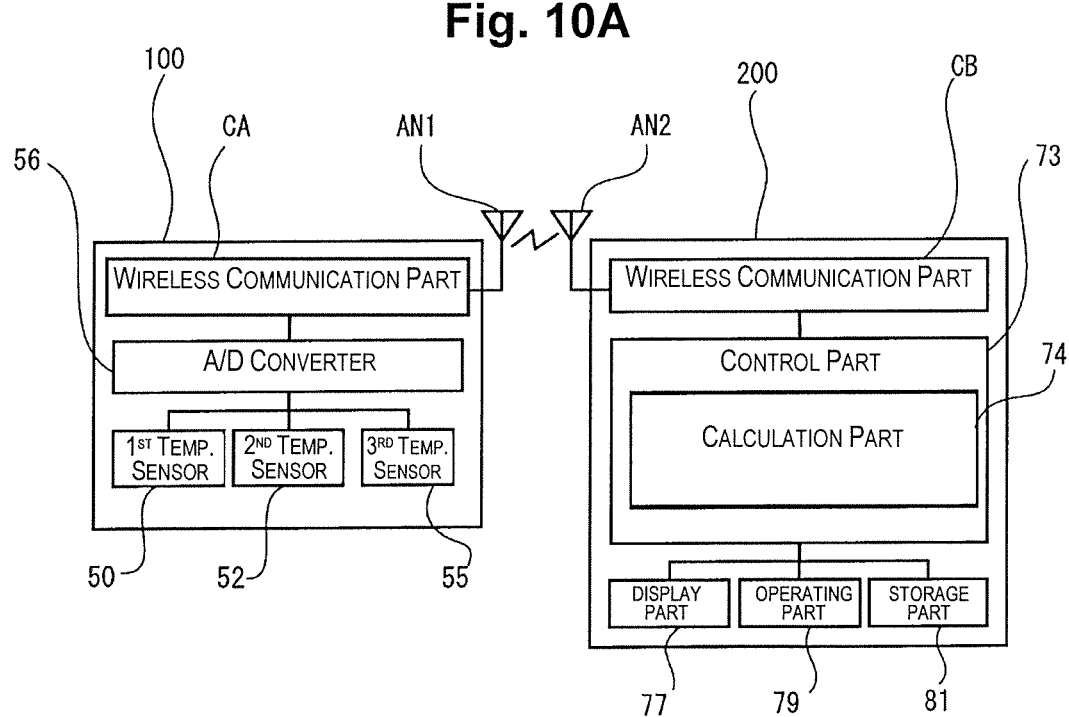

FIGS. 10A and 10B are views showing a practical example of the temperature measurement device in which wireless communication is utilized. In FIG. 10A, the first unit 100 is attached (affixed) to a body surface 6A of the chest of a child as the measured body 6. The second unit 200 is attached to the left wrist of a caregiver (user of the temperature measurement device) MA who is holding the child as the measured body 6. The second unit 200 in this configuration also functions as a display part.

As shown in FIG. 10B, the first unit 100 has the first temperature sensor 50, the second temperature sensor 52, the third temperature sensor 55, an A/D converter 56, the wireless communication part CA, and an antenna AN1. The second unit 200 has the wireless communication part CB, the control part 73, the calculation part 74, a display part 77, an operating part 79, and a storage part 81. The operating part 79 can serve also as the timing control information input part 83 shown in FIG. 4.

A computation equation for computing the plurality of constants a, b, and d described above, or a computation equation for computing the deep temperature Tc is stored in the calculation part 74. In the storage part 81, the received first temperature Tb, second temperature Tp, and environment temperature Tout are stored, the computed values of the plurality of constants a, b, and d are stored, and the calculated deep temperature Tc is also stored.

The storage part 81 is configured so as to be capable of storing temperature information relating to a plurality of measured bodies (subjects in this case). Consequently, the deep temperature Tc and other data can be stored for each child as a subject. Information other than temperature information, e.g., the name and age of the measured body 6 (child as a subject), the measurement time, and other measurement information, may also be stored in the storage part 81. In this case, the caregiver (user of the temperature measurement device) MA may input this other measurement information by operating the operating part 79.

The temperature measurement device operates as described below, for example. The caregiver MA turns on the power supply of the second unit 200 by operating the operating part 79 of the second unit 200. Radio waves are then transmitted from the wireless communication part CB. An electromotive force is generated in the antenna AN1 by electromagnetic induction by the radio waves, and a power supply (battery) in the first unit 100 is charged by the electromotive force. The first unit 100 then activates, and the first temperature sensor 50, the second temperature sensor 52, and the third temperature sensor 55 activate. The first unit 100 then transmits a standby signal to the second unit 200.

When the standby signal is received, the control part 73 in the first unit 100 instructs the wireless communication part CB to transmit a temperature measurement initiation signal. When the temperature measurement initiation signal is received, the first unit 100 initiates temperature measurement by the first temperature sensor 50, the second temperature sensor 52, and the third temperature sensor 55. The first temperature Tb and the second temperature Tp are preferably measured in a state in which heat transfer from the deep part of the measured body 6 to the body surface 6A is in a steady state (equilibrium state). Temperature measurement is therefore preferably started at the timing at which the time necessary for an equilibrium state to be attained has elapsed from the reception timing of the temperature measurement initiation signal.

The measured temperature information (first temperature Tb, second temperature Tp, third temperature Tout) is converted from an analog signal to a digital signal by the A/D converter 56 and transmitted to the second unit 200 by the wireless communication part CA. temperature measurement is executed a plurality of times, and measurement data are transmitted for each measurement. The interval at which each measurement is executed may be adjusted as appropriate for conditions or trends in the environment (atmosphere or the like).

The calculation part 74 in the second unit 200 temporarily stores, in the storage part 81, sets of data including the first temperature Tb, second temperature Tp, and third temperature Tout, sent at predetermined intervals. When all of the necessary data have been obtained, a predetermined calculation is executed by the procedure described above to measure the deep temperature Tc of the subject (child) 6. The measured deep temperature Tc is displayed in the display part 77, for example.

Figure 11:
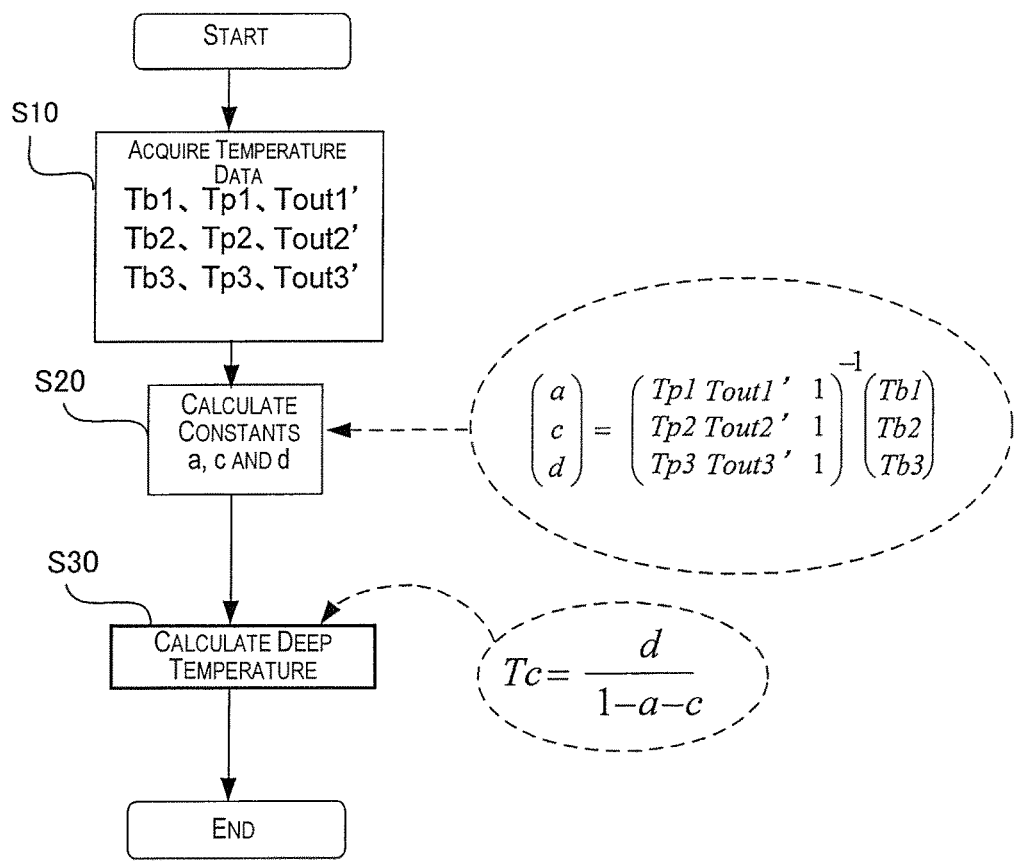
FIG. 11 is a view showing the procedure for measuring the deep temperature in the first embodiment.

FIG. 11 is a view showing the procedure for measuring the deep temperature in the first embodiment. Temperature data are first acquired (step S10). The temperature data include the first temperature Tb1, second temperature Tp1, and third temperature Tout1 obtained by the first measurement, the first temperature Tb2, second temperature Tp2, and third temperature Tout2 obtained by the second measurement, and the first temperature Tb3, second temperature Tp3, and third temperature Tout3 obtained by the third measurement.

The plurality of constants a, c, and d are then computed (step S20). The first computation equation previously described is then used to calculate the deep temperature (step S30).

(Example of the Deep Temperature Measurement Results)

Following is a description of the results of computing the deep temperature Tc by computer simulation for each installation position when the installation position of the third temperature sensor 55 is varied. In the present embodiment, the environment equivalent temperature (third temperature) measured by the third temperature sensor 55 provided to the substrate 40 is used instead of the temperature (environment temperature) Tout of the environment 7, as described above. In order to increase the measurement precision of the deep temperature Tc, it is important that the third temperature Tout', which varies linearly so as to follow the environment temperature Tout, be measured as accurately as possible.

Figure 12:
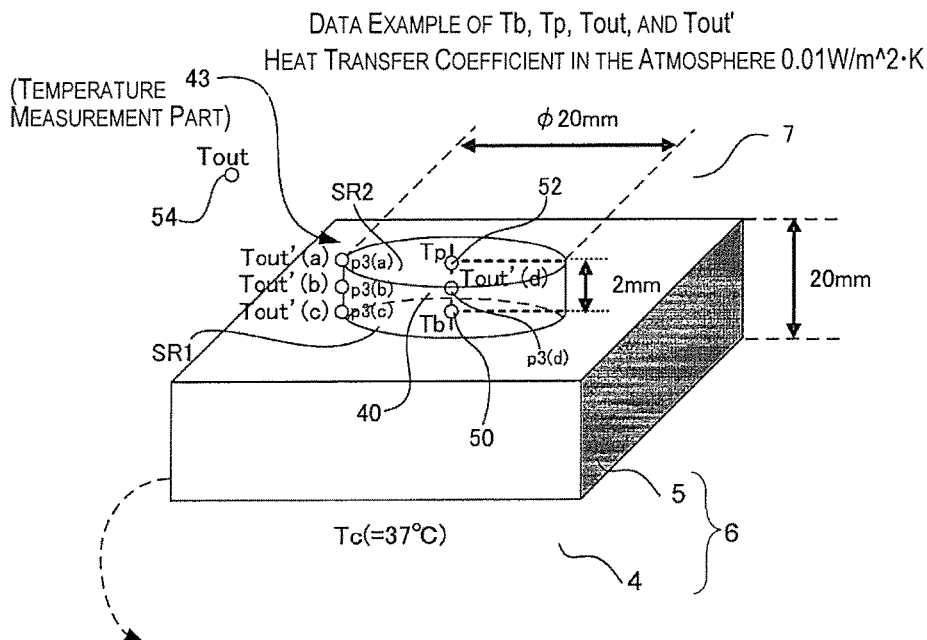
FIG. 12 is a view showing the deep temperature computation results for each installation position when the installation position of the third temperature sensor is varied.

FIG. 12 is a view showing the deep temperature computation results for each installation position when the installation position of the third temperature sensor is varied. In the example shown in FIG. 12, a plurality of third temperature sensors 55 is disposed in different positions of the substrate 40, the deep temperature Tc is computed by using the measurement values of each temperature sensor, and the measurement precision is compared. The preferred installation position of the third temperature sensor 55 for measuring the environment equivalent temperature Tout' thereby becomes apparent. A detailed description is given below.

In the example shown in FIG. 12, the third temperature sensor 55 for measuring the environment equivalent temperature Tout' is installed at four points which include measurement point p3($a$) through measurement point p3($d$).

Measurement point p3($a$) is a measurement point positioned at the top (near the second surface SR2 of the substrate 40) of the lateral surface of the substrate 40, measurement point p3($b$) is a measurement point positioned at the center of the lateral surface of the substrate 40, and measurement point p3($c$) is a measurement point positioned at the bottom (near the first surface SR1 of the substrate 40) of the lateral surface of the substrate 40. Measurement point p3($d$) is a measurement point positioned inside (near the center of the substrate 40) the substrate 40. Measurement points p3($b$) and p3($d$) are disposed substantially in a horizontal row.

In the example shown in FIG. 12, a human body is assumed as the measured body 6, and the temperature Tc of the deep part 4 is set to 37° C. In this experiment, polyvinyl chloride (PVC) is used as the material of the structural body that corresponds to the surface layer part 5. The thermal conductivity of polyvinyl chloride is 0.144283 (W/m·K). The thickness of the PVC structural body (rectangular solid) that corresponds to the surface layer part 5 is set to 20 mm. A substrate 40 composed of silicone rubber having a round columnar shape is also provided at the center on an upper surface of the PVC structural body. The thermal conductivity of silicone rubber is 0.05 (W/m·K).

The cross-section of the substrate 40 is circular, and the diameter of the circle is 20 mm. The height of the substrate 40 is 2 mm. The first temperature sensor 50 and the second temperature sensor 52 are positioned at two points (first measurement point and second measurement point) on a normal line L1 perpendicular to the bottom surface (i.e., the contact surface) SR1 of the substrate 40. The distance between the first temperature sensor 50 and the second temperature sensor 52 is 2 mm. In other words, the first measurement point is set on the bottom surface (contact surface) SR1 of the substrate 40, and the second measurement point is set on the upper surface SR2 of the substrate 40.

In the example shown in FIG. 12, the heat transfer coefficient (a constant proportional to the mobility of heat in the atmosphere) of the environment (atmosphere) 7 is set to 0.01 W/m$^2$·K. The atmosphere temperature sensor 54 is provided to measure the environment temperature Tout.

In the example shown in FIG. 12, the environment temperature Tout, the environment equivalent temperature Tout', the first temperature Tb, and the second temperature Tp are measured n times. In this example, three (n=3) temperature measurements are executed. The value of the environment temperature Tout (Tout1 through Tout3) is also varied for each of the three measurements. Tout1 is 23° C., Tout2 is 30° C., and Tout3 is 35° C.

An example of the measured data is shown in tabular form at the bottom of FIG. 3B. The second temperatures Tp corresponding to Tout1 through Tout3 are designated as Tp1 through Tp3. Tp1 is 27.4605° C., Tp2 is 32.2303° C., and Tp3 is 35.6372° C.

The first temperatures Tb corresponding to Tout1 through Tout3 are designated as Tb1 through Tb3. Tb1 is 29.2884° C., Tb2 is 33.1442° C., and Tb3 is 35.8983° C.

The Tout' at measurement point p3($a$) is designated as Tout'($a$), and the Tout'($a$) values corresponding to Tout1 through Tout3 are designated as Tout'1($a$), Tout'2($a$), and Tout'3($a$). At this time, Tout'1($a$) is 26.2482° C., Tout'2($a$) is 31.6241° C., and Tout'3($a$) is 35.8983° C.

The Tout' at measurement point p3(*b*) is designated as Tout'(b), and the Tout'(b) values corresponding to Tout1 through Tout3 are designated as Tout'1(*b*), Tout'2(*b*), and Tout'(*b*). At this time, Tout'1(*b*) is 27.1235° C., Tout'2(*b*) is 32.0617° C., and Tout'3(*b*) is 35.5891° C.

The Tout' at measurement point p3(*c*) is designated as Tout'(c), and the Tout'(c) values corresponding to Tout1 through Tout3 are designated as Tout'1(*c*), Tout'2(*c*), and Tout'3(*c*). At this time, Tout'1(*c*) is 28.7516° C., Tout'2(*c*) is 32.8758° C., and Tout'3(*c*) is 35.8217° C.

The Tout' at measurement point p3(*d*) is designated as Tout'(d), and the Tout'(d) values corresponding to Tout1 through Tout3 are designated as Tout'1(*d*), Tout'2(*d*), and Tout'3(*d*). At this time, Tout'1(*d*) is 28.371° C., Tout'2(*d*) is 32.6855° C., and Tout'3(*d*) is 35.8983° C.

As described above, the values of a, c, and d are calculated from the value of the first temperature Tb, the second temperature Tp, and the environment temperature Tout, and from the value of the environment equivalent temperature Tout', and the deep temperature Tc can be calculated by the calculation d/(1−a−c).

The deep temperature Tc1 calculated by using the environment temperature Tout was 36.9999. Since the true deep temperature was 37° C., the measurement error is slight, being 0.0001° C.

The deep temperature Tc2 calculated by using the environment equivalent temperature Tout'(a) was 36.9999, and a highly precise measurement result was obtained, the same as in the case of Tc1.

The deep temperature Tc3 calculated by using the environment equivalent temperature Tout'(b) was 36.9998. This is a highly precise measurement result, but the measurement error was 0.0002° C., which was larger than that of Tc1 and Tc2.

The deep temperature Tc4 calculated by using the environment equivalent temperature Tout'(c) was 36.9996. This is a highly precise measurement result, but the measurement error was 0.0004° C., which was larger than that of Tc1 through Tc3.

The deep temperature Tc5 calculated by using the environment equivalent temperature Tout'(d) was 36.9996 (the same as Tc4). This is a highly precise measurement result, but the measurement error was 0.0004° C., which was larger than that of Tc1 through Tc3, and the same as that of Tc4.

From the above measurement results, it is apparent that the deep temperature Tc can be measured with considerably high precision regardless of which of the first measurement point p3(*a*) through fourth measurement point p3(*d*) is the installation point of the third temperature sensor 55 for measuring the environment equivalent temperature Tout'.

It is apparent that when the third temperature sensor 55 is installed at measurement point p3(*a*), the highest measurement precision is obtained, equivalent to measuring the environment temperature Tout directly, for the reasons described below. First, the first computation equation (Equation (1)) described above is derived by a compensation calculation under conditions in which the environment temperature Tout (environment equivalent temperature Tout') is equal to the deep temperature Tc. In other words, since Tout (Tout')=Tc according to the assumed conditions in the compensation calculation equation, the fact that the environment equivalent temperature Tout' that is actually measured differs somewhat from the environment temperature Tout does not significantly affect the compensation calculation. However, since the temperature distribution in the substrate is assumed to be linear with respect to the environment temperature Tout in the compensation calculation equation, in a case in which there is a large difference between the actual environment temperature Tout and the value of the environment temperature Tout' used in the calculation, the assumption that the temperature distribution in the substrate is linear with respect to the environment temperature Tout may no longer be satisfied, and an error occurs in the deep temperature measurement results in this case. Measures are therefore preferably taken to ensure that the difference between the environment equivalent temperature Tout' and the environment temperature Tout is small.

In this configuration, measurement point p3(*a*) is positioned near the top of the lateral surface of the substrate 40, and is positioned farthest from the measured body 6 in relation to the other measurement points. The third temperature sensor 55 installed at measurement point p3(*a*) is therefore not readily affected by the heat flow that occurs between the measured body 6 and the environment 7, and the difference between the environment equivalent temperature Tout' and the environment temperature Tout can therefore be suppressed by a corresponding amount. This configuration is therefore considered to produce the smallest measurement error of the deep temperature Tc.

In the same manner, when measurement point p3(*b*) and measurement point p3(*c*) are compared, measurement point p3(*c*) is positioned closer to the deep part 4 of the measured body 6 as the heat source. Therefore, when the third temperature sensor 55 is installed at measurement point p3(*c*), the third temperature sensor 55 is more readily affected by the heat flow that occurs between the measured body 6 and the environment 7. The measurement error is therefore considered to increase by a corresponding amount.

Measurement point p3(*d*) is positioned inside (near the center) of the substrate 40. The distance thereof from the first surface SR1 of the substrate 40 is the same as that of measurement point p(*b*), but the distance thereof to the lateral surface of the substrate 40 is different. In other words, the ease with which heat exchange occurs with the environment 7 is different when the third temperature sensor 55 is installed at measurement point p(*b*) than when the third temperature sensor 55 is installed at measurement point p3(*d*). In other words, the positioning of measurement point p3(*d*) inside the substrate 40 is disadvantageous in terms of heat exchange with the environment 7. Consequently, the measurement precision of the deep temperature Tc5 obtained by installing the third temperature sensor 55 at measurement point p3(*d*) is lower than that of Tc1 through Tc3.

It is therefore apparent that the third temperature sensor 55 for measuring the environment equivalent temperature Tout' is preferably installed at a location where the third temperature sensor 55 is not readily affected by the heat flow that occurs between the measured body 6 and the environment 7, and where heat exchange with the environment 7 readily occurs. Specifically, installation on the external surface of the substrate 40 is preferable to installation inside the substrate 40. For example, the third temperature sensor 55 may be installed near the lateral surface of the substrate 40. The third temperature sensor 55 is preferably disposed in a position distant from the measured body 6. For example, the third temperature sensor 55 is most preferably installed near the top of the lateral surface of the substrate 40 (although this configuration is not limiting).

In the example shown in FIG. 12, the position of the third measurement point for measuring the third temperature Tout' is varied after the first measurement point p1 for measuring the first temperature Tb and the second measurement point p2 for measuring the second temperature Tp are fixed.

An example experiment will next be described in which the positions of the first measurement point p1 and the second measurement point p2 are varied after the third measurement point p3 is fixed. Through this example experiment, it is apparent that the deep temperature Tc is measured with adequately high precision regardless of the position in the substrate 40 of the first measurement point p1 and the second measurement point p2 when the deep temperature Tc is measured.

FIGS. 13 through 18 will be used to describe data examples of the first temperature Tb and second temperature Tp obtained when the environment temperature Tout is varied in three stages, and examples (computation result examples) of the deep temperature that is computed based on the data examples. In the following examples, the environment temperature Tout is measured three times by an atmosphere temperature sensor 54 provided in an atmosphere, for example, and an environment temperature Toutn (n=1, 2, 3) is obtained.

Figure 13:
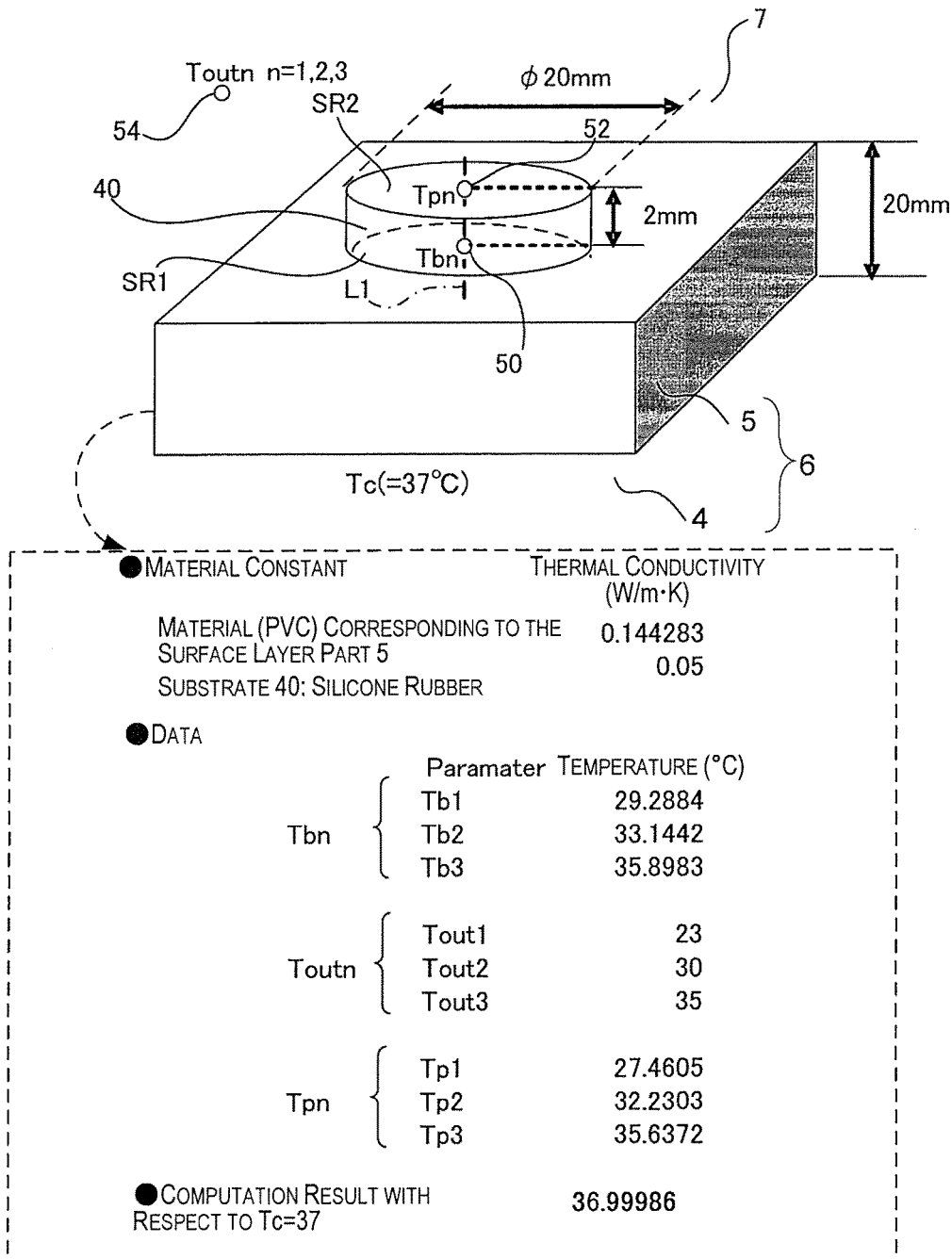
FIG. 13 is a view showing an example of the deep temperature computation results.

(Example Shown in FIG. 13)

FIG. 13 is a view showing an example of the deep temperature computation results. In FIG. 13, a human body is assumed as the measured body 6, and the temperature Tc of the deep part 4 is set to 37° C. In this experiment, polyvinyl chloride (PVC) is used as the material of the structural body that corresponds to the surface layer part 5. The thermal conductivity of polyvinyl chloride is 0.144283 (W/m·K).

The thickness of the PVC structural body (rectangular solid) that corresponds to the surface layer part 5 is set to 20 mm. A substrate 40 composed of silicone rubber having a round columnar shape is also provided at the center on an upper surface of the PVC structural body. The thermal conductivity of silicone rubber is 0.05 (W/m·K).

The cross-section of the substrate 40 is circular, and the diameter of the circle is 20 mm. The height of the substrate 40 is 2 mm. The first temperature sensor 50 and the second temperature sensor 52 are positioned at two points (first measurement point and second measurement point) on a normal line L1 perpendicular to the bottom surface (i.e., the contact surface) SR1 of the substrate 40. The distance between the first temperature sensor 50 and the second temperature sensor 52 is 2 mm. In other words, the first measurement point is set on the bottom surface (contact surface) SR1 of the substrate 40, and the second measurement point is set on the upper surface SR2 of the substrate 40.

In the example shown in FIG. 13, the heat transfer coefficient (a constant proportional to the mobility of heat in the atmosphere) of the environment (atmosphere) 7 is set to 0.01 W/m²·K. The environment temperature (third temperature) Tout, the first temperature Tb, and the second temperature Tp are measured n times. In the present example, temperature measurement is executed three times, and n is therefore 1, 2, or 3.

Tout1 is 23° C., Tout2 is 30° C., and Tout3 is 35° C. Tb1 is 29.2884° C., Tb2 is 33.1442° C., and Tb3 is 35.8983° C. Tp1 is 27.4605° C., Tp2 is 32.2303° C., and Tp3 is 35.6327° C.

The measured (computed) deep temperature is 36.99986° C., which includes only a slight error in comparison with the actual deep temperature Tc (=37° C.). In other words, it is apparent that the deep temperature can be measured with extremely high precision by using a substrate 40 which is reduced in size.

Figure 14:
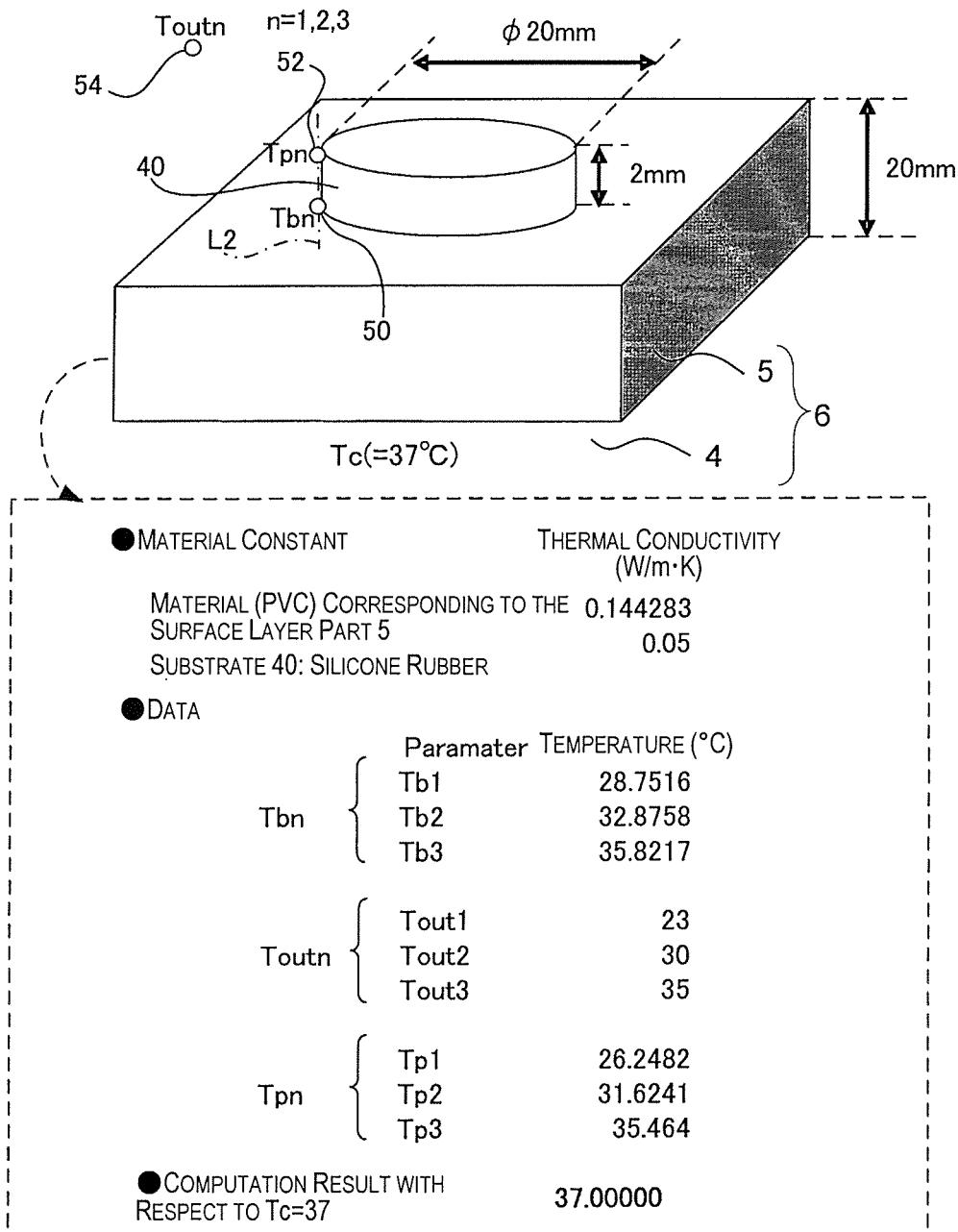
FIG. 14 is a view showing another example of the deep temperature computation results.

(Example of FIG. 14)

FIG. 14 is a view showing another example of the deep temperature computation results. The measurement environment and measurement conditions in the example of FIG. 14 are basically the same as in the example of FIG. 13. However, in the example of FIG. 14, the first temperature sensor 50 and the second temperature sensor 52 are provided on a side surface of the substrate 40 on a normal line L2. The distance between the first temperature sensor 50 and the second temperature sensor 52 is 2 mm.

Tout1 is 23° C., Tout2 is 30° C., and Tout3 is 35° C. Tb1 is 28.7516° C., Tb2 is 32.8758° C., and Tb3 is 35.8217° C. Tp1 is 26.2482° C., Tp2 is 31.6241° C., and Tb3 is 35.464° C.

The measured (computed) deep temperature is 37.00000° C., and no error is identified in relation to the actual deep temperature Tc (=37° C.). In other words, it is apparent that the deep temperature can be measured with extremely high precision by using a substrate 40 which is reduced in size.

Figure 15:
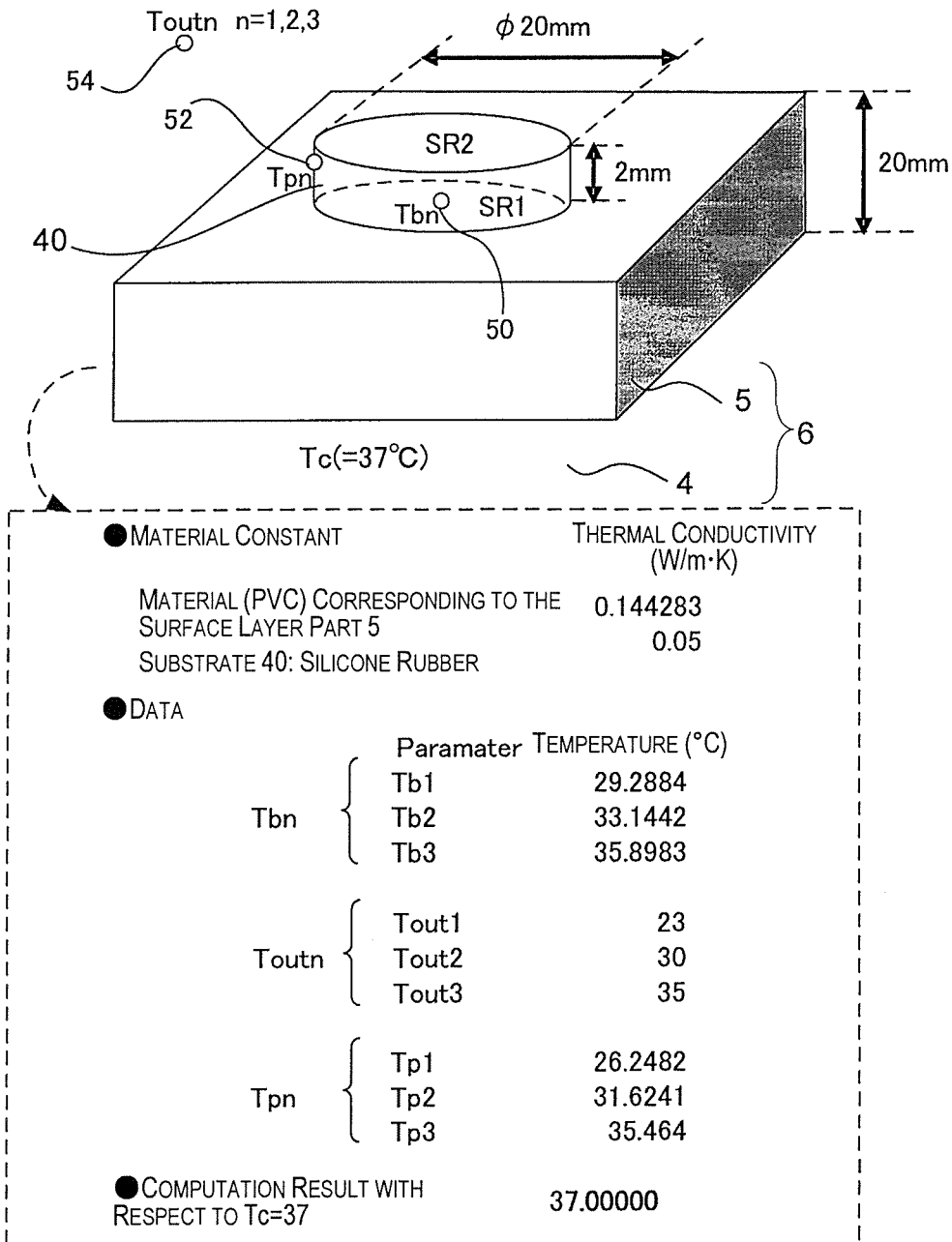
FIG. 15 is a view showing another example of the deep temperature computation results.

(Example of FIG. 15)

FIG. 15 is a view showing another example of the deep temperature computation results. The measurement environment and measurement conditions in the example of FIG. 15 are basically the same as in the above example. However, in the example of FIG. 15, the first temperature sensor 50 is provided in the vicinity of the center of the contact surface SR1 of the substrate 40, and the second temperature sensor 52 is provided on a side surface of the substrate 40.

Tout1 is 23° C., Tout2 is 30° C., and Tout3 is 35° C. Tb1 is 29.2884° C., Tb2 is 33.1442° C., and Tb3 is 35.8983° C. Tp1 is 26.2482° C., Tp2 is 31.6241° C., and Tb3 is 35.464° C.

The measured (computed) deep temperature is 37.00000° C., and no error is identified in relation to the actual deep temperature Tc (=37° C.). In other words, it is apparent that the deep temperature can be measured with extremely high precision by using a substrate 40 which is reduced in size.

Figure 16:
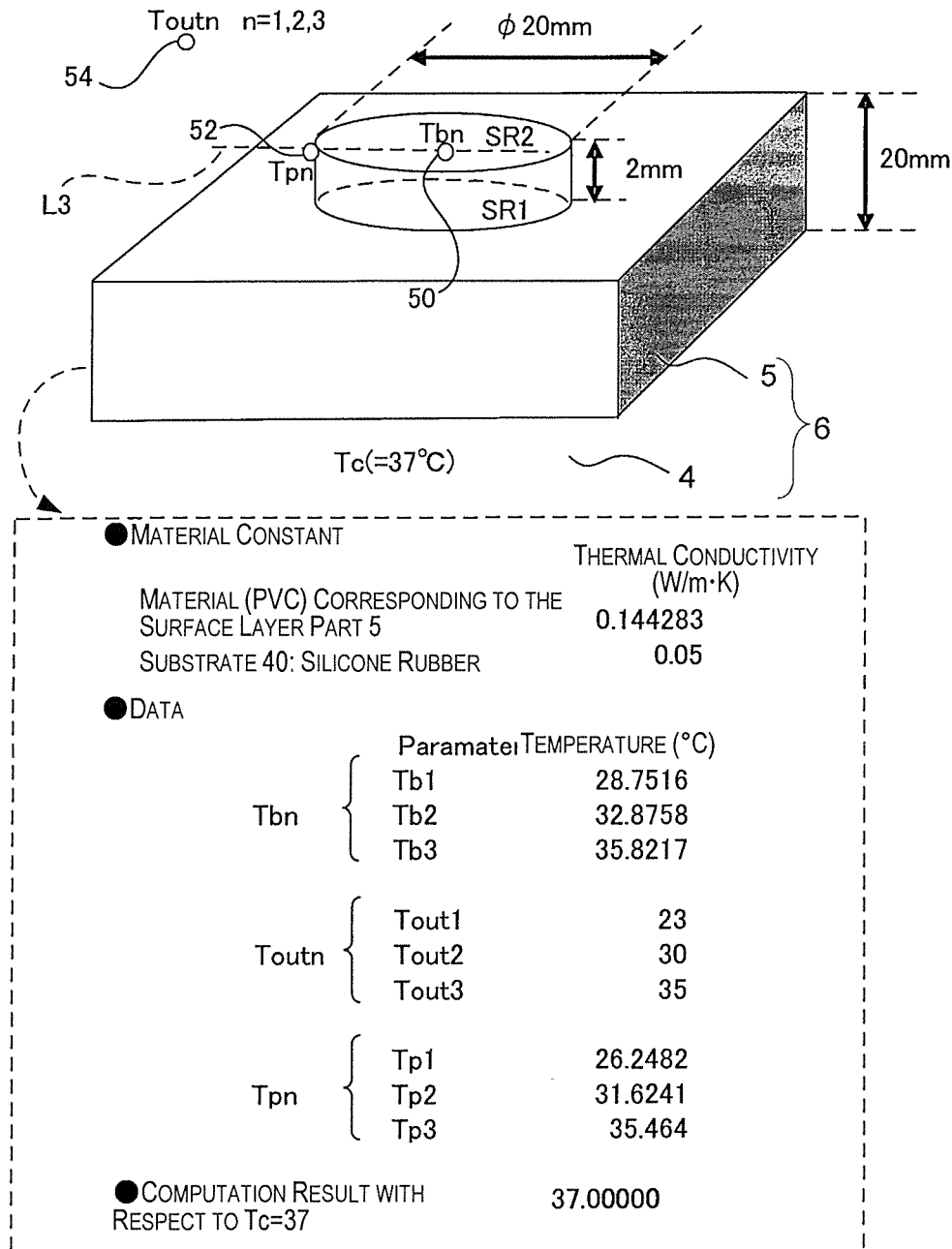
FIG. 16 is a view showing another example of the deep temperature computation results.

(Example of FIG. 16)

FIG. 16 is a view showing another example of the deep temperature computation results. The measurement environment and measurement conditions in the example of FIG. 16 are basically the same as in the above example. However, in the example of FIG. 16, the first temperature sensor 50 is provided on the upper surface SR2 of the substrate 40. The second temperature sensor 52 is provided on a side surface of the substrate 40. The second temperature sensor 52 is provided on a straight line L3 which passes through the first temperature sensor 50 and is parallel to the contact surface SR2. In other words, the first temperature sensor 50 and the second temperature sensor 52 are positioned on a horizontal line.

Tout1 is 23° C., Tout2 is 30° C., and Tout3 is 35° C. Tb1 is 28.7516° C., Tb2 is 32.8758° C., and Tb3 is 35.8217° C. Tp1 is 26.2482° C., Tp2 is 31.6241° C., and Tb3 is 35.464° C.

The measured (computed) deep temperature is 37.00000° C., and no error is identified in relation to the actual deep temperature Tc 37° C.). In other words, it is apparent that the deep temperature can be measured with extremely high precision by using a substrate 40 which is reduced in size.

It is apparent from the experimental results described above that the positional relationship of the first temperature sensor 50 and the second temperature sensor 52 creates no particular problems. In other words, the first temperature sensor 50 and the second temperature sensor 52 may be on a vertical line passing through the heat source (deep part of the measured body), or the first temperature sensor 50 and the second temperature sensor 52 may be positioned on a horizontal line.

Specifically, the first measurement point at which the first temperature sensor 50 is provided, and the second measurement point at which the second temperature sensor 52 is provided may be on an external surface (in the above examples, the contact surface SR1 on the bottom surface, the upper surface SR2, or the side surface) of the substrate 40, or at two points positioned inside the substrate 40. However, in order to compute the deep temperature by using a determinant, it is at least necessary to satisfy the condition that the set of Tb and Tp corresponding to any of the environment temperatures (third temperatures) Tout1, Tout2, and Tout3 not be the same value (Tb Tp). Specifically, there must be a temperature difference between at least one set of Tb and Tp among the three sets of first temperatures Tb and second temperatures Tp. The first unit 100 is therefore designed so that this condition is satisfied.

Figures 17A, 17B:
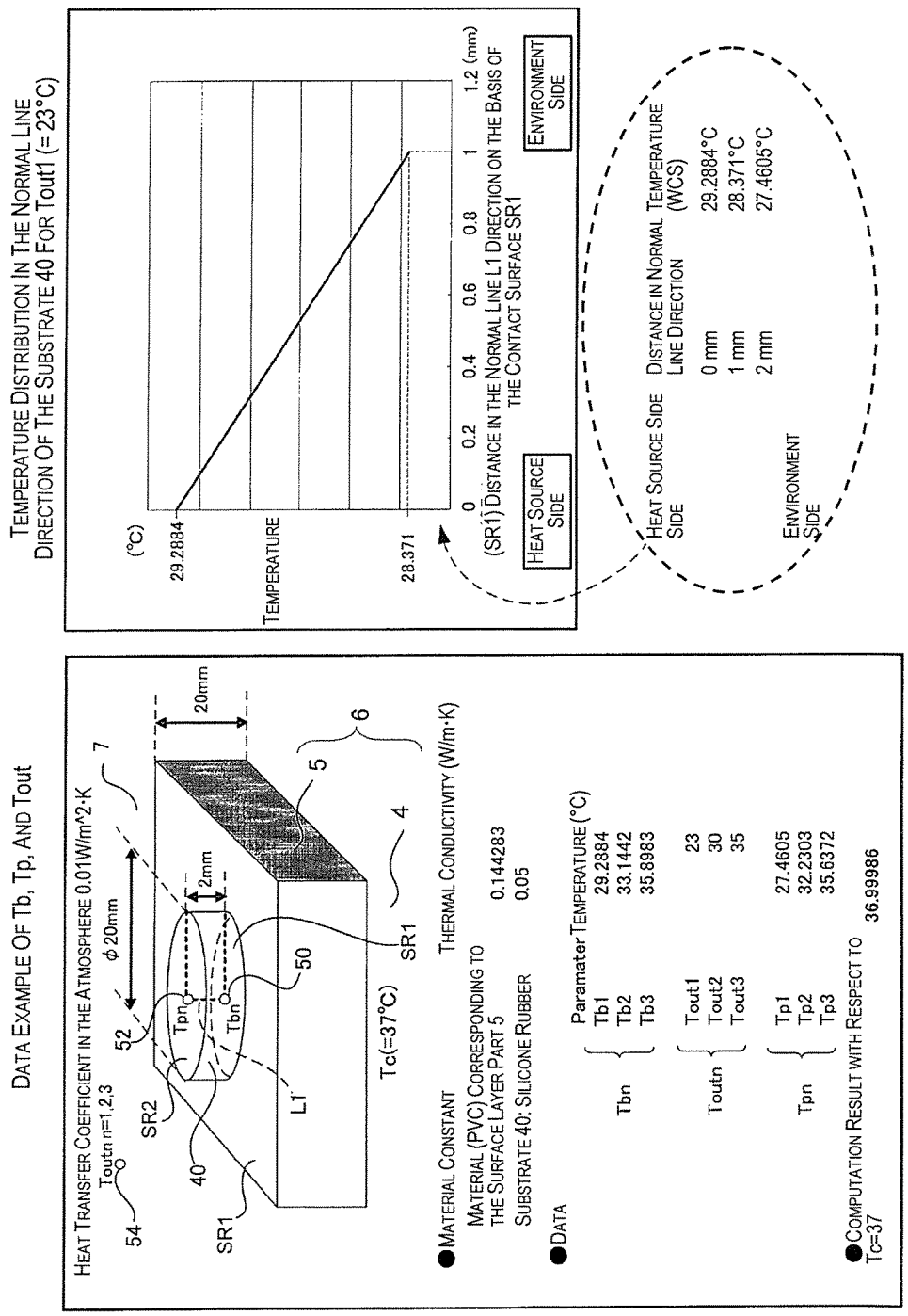
FIGS. 17A and 17B are views showing an example of the relationship between the temperature distribution inside the substrate and the measurement results.

The relationship between the temperature distribution inside the substrate 40 and the measurement results will next be described. FIGS. 17A and 17B are views showing an example of the relationship between the temperature distribution inside the substrate and the measurement results. The data example shown in FIG. 17A is the same as the data example shown in FIG. 13. FIG. 17B is a view showing the temperature distribution in the vertical direction of the substrate 40 at Tout1 (=23° C.). In FIG. 17B, the horizontal axis is the distance in the direction of the normal line L1 on the basis of the contact surface SR1, and the vertical axis is the temperature of the substrate 40. As shown in FIG. 17B, the temperature of the substrate 40 decreases linearly as the distance from the heat source (deep part 4 of the measured body 6) increases.

The data example of FIG. 17A is the results of computing the deep temperature with a heat distribution of the substrate 40 such as the one shown in FIG. 17B, and as previously described, measurement results are obtained having extremely high precision.

FIGS. 18A and 18B are views showing another example of the relationship between the temperature distribution inside the substrate and the measurement results. The measurement environment and measurement conditions in the example of FIG. 18A are basically the same as in the example of FIG. 17A. However, in the example of FIG. 18A, the height of the substrate 40 is 20 mm, which is ten times the height (2 mm) of the substrate 40 in the example of FIG. 17A. Since the surface area of the side surface of the column increases when the height of the substrate 40 increases, radiation of heat from the side surface of the columnar substrate 40 increases. The amount of radiation from the side surface varies according to the distance from the heat source (deep part 4 of the measured body 6).

FIG. 18B is a view showing the temperature distribution in the vertical direction of the substrate 40 at Tout1 (=23° C.). In FIG. 18B, the horizontal axis is the distance in the direction of the normal line L1 on the basis of the contact surface SR1, and the vertical axis is the temperature of the substrate 40. As shown in FIG. 18B, the temperature of the substrate 40 decreases as the distance from the heat source (deep part 4 of the measured body 6) increases, but the characteristic line indicating the temperature distribution is curved rather than linear. The reason for this is that the surface area of the side surface of the column increases, and radiation of heat from the side surface of the columnar substrate 40 increases when the height of the substrate 40 increases, and the amount of radiation from the side surface varies according to the distance from the heat source (deep part 4 of the measured body 6).

The data example of FIG. 18A is the results of computing the deep temperature with a heat distribution of the substrate 40 such as the one shown in FIG. 18B. Tout1 is 23° C., Tout2 is 30° C., and Tout3 is 35° C. Tb1 is 29.62274° C., Tb2 is 33.31137° C., and Tb3 is 35.94611° C. Tp1 is 23.29526° C., Tp2 is 30.14763° C., and Tb3 is 35.04218° C. The measured (computed) deep temperature is 37.00000° C., and no error is identified in relation to the actual deep temperature Tc (=37° C.). In other words, it is apparent that the deep temperature can be measured with extremely high precision by using the temperature measurement method of the present embodiment, even in a case in which the temperature distribution inside the substrate 40 is expressed by a curve. Consequently, the height of the substrate 40 is not restricted, and there is also no limitation placed on the ratio of the surface area of the cortact surface and the height of the substrate 40. The first unit 100 can therefore be configured with a considerable degree of freedom.

(Second Embodiment)

In the present embodiment, a second computation equation which differs from that of the previously described embodiment is used as the deep temperature computation equation. In the present embodiment, temperature measurement (acquisition of temperature information) is executed at least twice.

Figure 19:
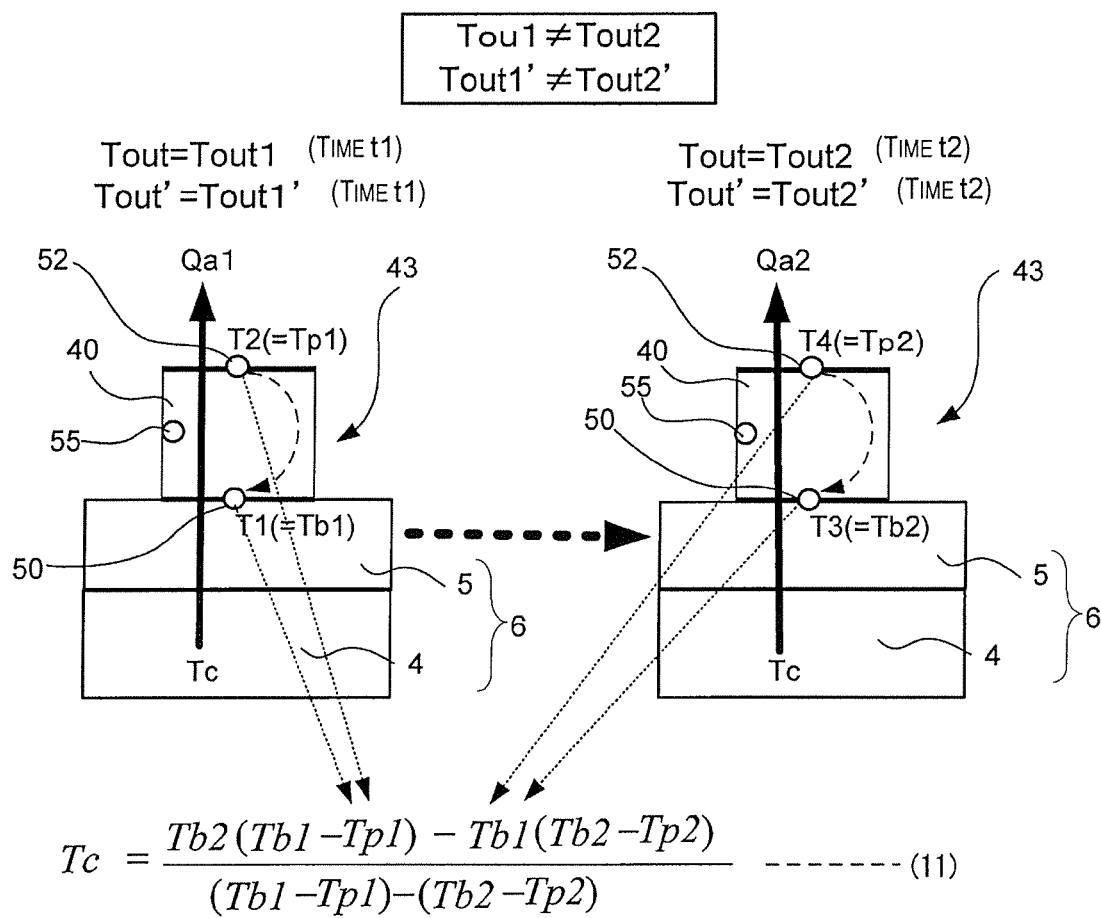
FIG. 19 is a view showing the method for measuring the deep temperature in a second embodiment.

FIG. 19 is a view showing the method for measuring the deep temperature in a second embodiment. As shown in FIG. 19, in the present embodiment, a first measurement and a second measurement are executed, and the environment temperature Tout1 (and third temperature Tout1') in the first measurement and the environment temperature Tout2 (and third temperature Tout2') in the second measurement are varied from each other.

The first temperature, second temperature, and third temperature obtained by the first measurement are designated as Tb1, Tp1, and Tout1', respectively, and the first temperature, second temperature, and third temperature obtained by the second measurement are designated as Tb2, Tp2, and Tout2', respectively.

The calculation part 74 executes calculation by a second computation equation by using the first temperature Tb1 and second temperature Tp obtained by the first measurement, and the first temperature Tb2 and second temperature Tp2 obtained by the second measurement, and computes the deep temperature Tc. The second computation equation is expressed by Equation (11) below.

[Eq. 17]

$$Tc = \frac{Tb2(Tb1 - Tp1) - Tb1(Tb2 - Tp2)}{(Tb1 - Tp1) - (Tb2 - Tp2)} \quad (11)$$

When the second computation equation according to Equation (11) is used, the value of the environment temperature Tout2 (third temperature Tout2') in the second measurement must be different from the value of the environment temperature Tout1 (third temperature Tout1') in the first measurement.

FIGS. 20 and 21 will be used to describe a reason that the deep temperature can be measured without the occurrence of an error component caused by a heat balance when the second computation equation shown in Equation (11) is used.

Figure 20A:
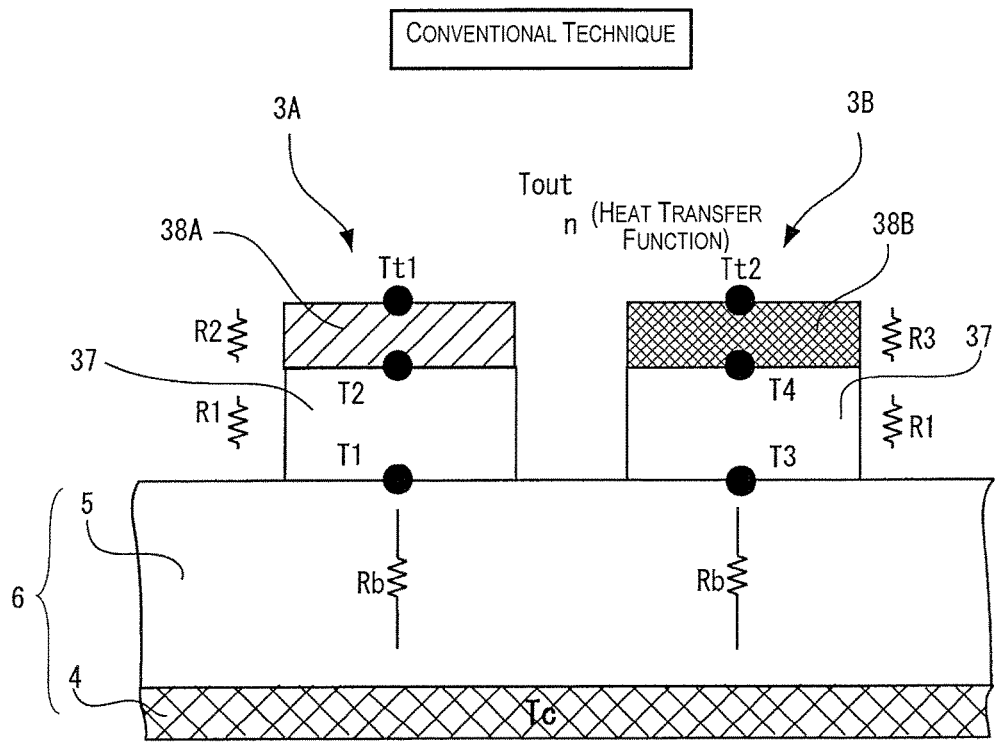
FIGS. 20A and 20B are views showing a reason that an error component caused by a heat balance occurs in the technique described in Patent Citation 1.
Figure 20B:
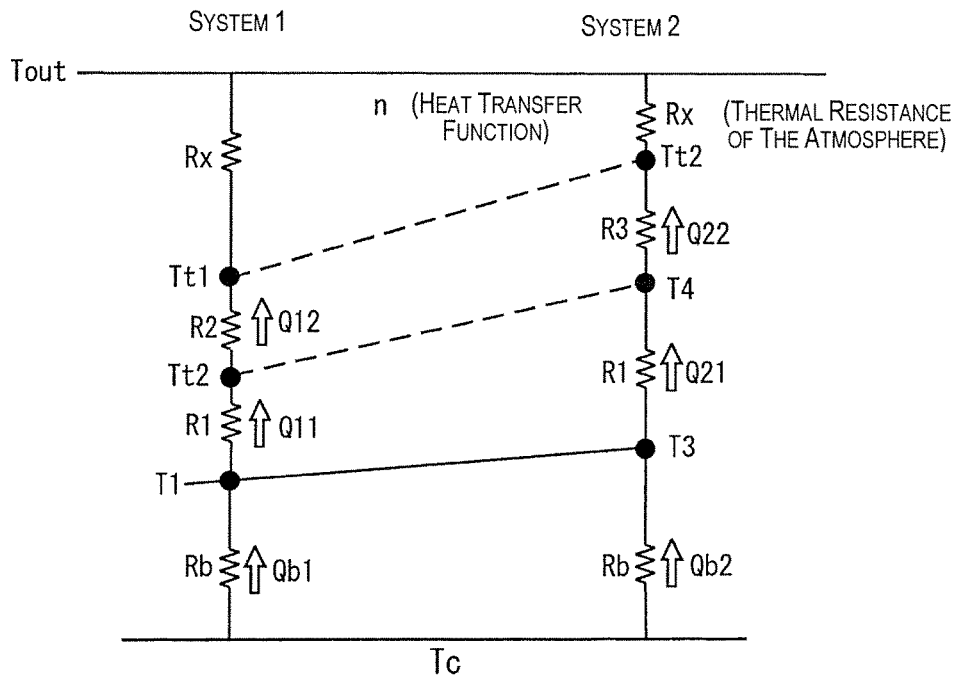

FIGS. 20A and 20B are views showing a reason that an error component caused by a heat balance occurs in the technique described in Patent Citation 1. FIG. 20A shows the temperatures (T1, T2, Tt1, T2, T4, Tt2) of six points and the state of thermal resistance in the temperature measurement parts of the technique. FIG. 20B shows the state of thermal resistance and the heat flux between the environment temperature (third temperature) Tout and the deep temperature Tc in the temperature measurement parts shown in FIG. 20A.

In the technique, two temperature measurement parts disposed parallel to each other are used, and two heat flow systems are formed. The environment temperature (third temperature) Tout is constant, and the temperature measurement parts are thermally shielded from the environment (atmosphere) by the first heat insulator 38A and the second heat insulator 38B provided to the upper surface of the substrate 40. The heat transfer coefficient (a constant proportional to the mobility of heat in a gas) of the environment (atmosphere) is n. The thermal resistance of the surface layer part of the measured body is Rb, the thermal resistance of the substrate 40 is R1, the thermal resistance of the first heat insulator 38A is R2, and the thermal resistance of the second heat insulator 38B is R3.

In the technique, two different heat fluxes are formed by making the heat insulator 38A and the heat insulator 38B different from each other under the assumption that the environment temperature Tout is constant. In other words, in the technique, it is assumed that the relationship Qb1=Q11=Q12 is established for the heat flux Qb1, the heat flux Q11, and the heat flux Q12, and that the relationship Qb2=Q21=Q22 is established for the heat flux Qb2, the heat flux Q21, and the heat flux Q22.

However, as the temperature measurement parts are further reduced in size, the temperatures (T1, T2, Tt1) of three points of the first system and the temperatures (T2, T4, Tt2) of three points in the second system are affected by the environment temperature (third temperature) Tout. The assumption that Qb1=Q11=Q12 and that Qb2=Q21=Q22 therefore no longer holds. In this case, the left side of Equation (F) as the computation equation of the technique is Tc+ΔTc, and a measurement error ΔTc corresponding to the difference of the heat balance occurs.

In other words, in the thermometer described in Patent Citation 1, the temperature measurement parts are configured so as to be shielded from the environment (atmosphere) by heat insulators provided to the surface layer parts, and are therefore designed under the design concept that the heat fluxes terminate at the tops of the temperature measurement parts, and that the heat balance with the environment (atmosphere) is substantially negligible. However, when the thermometer is further reduced in size, a heat balance is manifested between the side surfaces of the temperature measurement parts and the environment (atmosphere), for example, and a measurement error that corresponds to the difference of the heat balance can no longer be ignored.

Figure 21A:
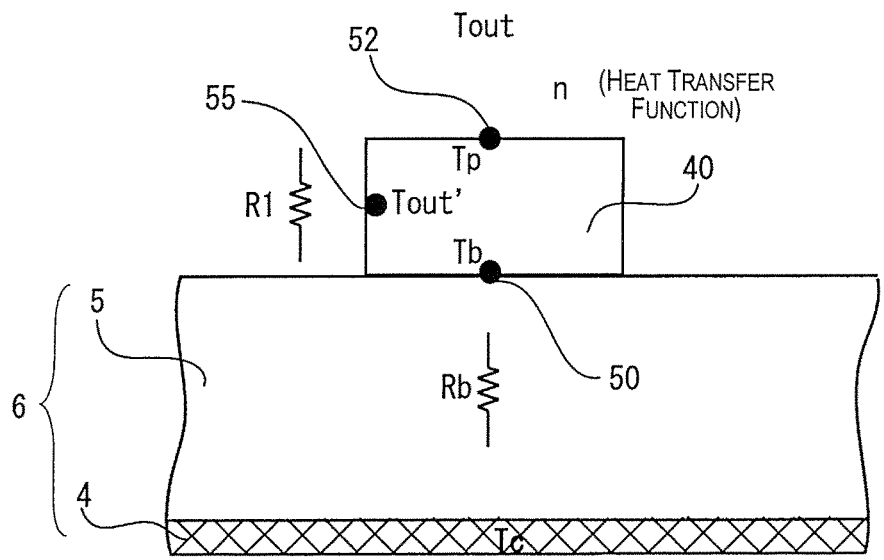
FIGS. 21A and 21B are views showing a reason that an error component caused by a heat balance does not occur in the second embodiment of the invention.
Figure 21B:
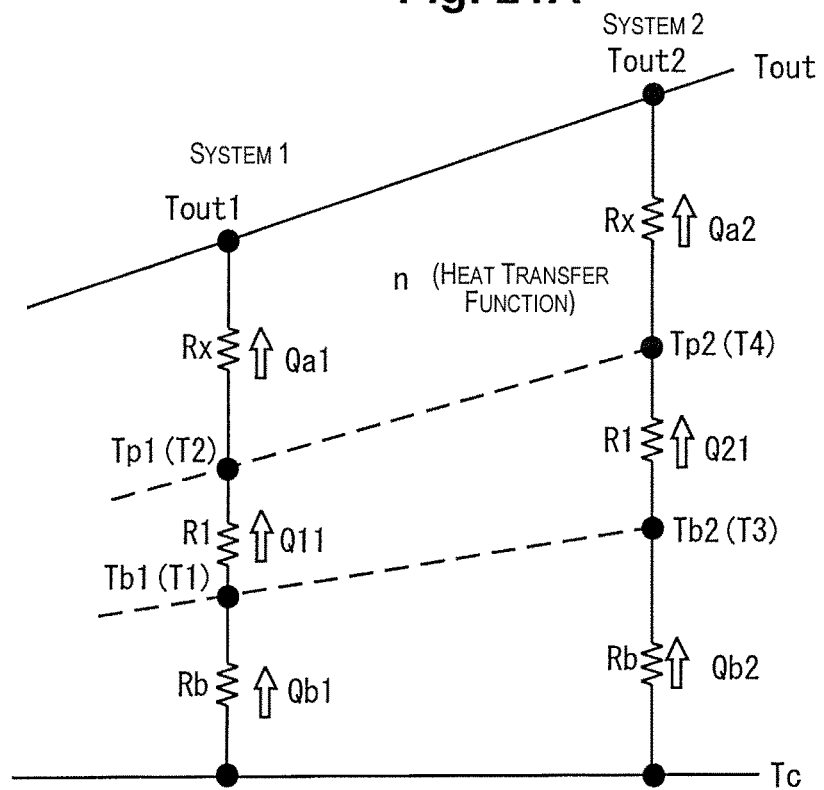

FIGS. 21A and 21B are views showing a reason that an error component caused by a heat balance does not occur in the second embodiment of the invention. FIG. 21A shows the temperatures and the state of thermal resistance in the temperature measurement part according to the second embodiment. FIG. 21B shows the state of thermal resistance and heat flux between the environment temperatures Tout1, Tout2 and the deep temperature Tc in the temperature measurement part shown in FIG. 21A.

In the present embodiment, temperature measurement (acquisition of temperature information) is executed at least twice, and the value of the environment temperature Tout is varied in each temperature measurement (Tout1 Tout2). When two temperature measurements are executed with different environment temperatures, a first heat flux system is formed in which the starting end is the deep part 4 of the measured body, and the terminal end is the environment (atmosphere or the like) in the first measurement. In the second measurement, a second heat flux system is formed in which the starting end is the deep part of the measured body, and the terminal end is the environment (atmosphere or the like). Since the environment temperature Tout is different in each system, the heat fluxes of each system are mutually different.

The heat transfer coefficient (a constant proportional to the mobility of heat in a gas) of the environment (atmosphere) 7 is n. The first temperatures are Tb1 (or T1), Tb2 (or T3). The second temperatures are Tp1 (or T2), Tp2 (or T4). The thermal resistance of the surface layer part 5 of the measured body 6 is Rb, and the thermal resistance of the substrate 40 is R1. As shown in FIG. 21B, a heat flux Qb1, a heat flux Q11, and a heat flux Qa1 occur in the first system. A heat flux Qb2, a heat flux Q21, and a heat flux Qa2 occur in the second system.

Since the terminal end of the heat flux in these two heat flux systems is the environment 7, in which temperature fluctuation is allowed, the concept of the heat balance difference, which was a problem in the technique, does not occur. In other words, the environment temperature Tout (and the third temperature Tout') is unambiguously determined (appropriately fluctuates) so as to encompass the heat balance.

The thermal conductivity (i.e., thermal resistance) of the substrate 40 used is the same in the first heat flux system and the second heat flux system. In other words, there is no change in the distribution of thermal resistance between the first system and the second system. Therefore, when the first measurement point and second measurement are set, the value of (Difference in temperature between the first measurement point and the second measurement point)/(Difference between the deep temperature Tc of the measured body and the temperature of the first measurement point) is the same for the first heat flux system and the second heat flux system. The equation below is thus established.

[Eq. 18]

$$\frac{(Tb1 - Tp1)}{(Tc - Tb1)} = \frac{(Tb2 - Tp2)}{(Tc - Tb2)} \qquad (12)$$

When Equation (12) is solved for Tc, the second computation equation described above (Equation (11) described above) is obtained. Since the concept of the error component ΔTc in the technique does not occur, a substantially ideal deep temperature Tc is obtained by the second computation equation.

The second computation equation (Equation (11)) appears the same as the computation equation (Equation (F)) in the technique in terms of format, but the second computation equation (Equation (11)) is fundamentally different from the computation equation (Equation (F)) of the technique. In other words, the second computation equation (Equation (11)) is derived from the perspective that the ratio of the thermal resistance in the substrate is the same, on the basis of the data obtained from two heat flux systems in which the environment is the terminal end, and the second computation equation is fundamentally different.

In the present embodiment, the environment temperature Tout (and the third temperature Tout') is not directly related to the deep temperature Tc computation as such. However, as described above, Tout1 (and Tout1') in the first measurement and Tout2 (and Tout2') in the second measurement must be different, and when Tout1=Tout2 (Tout1'=Tout2'), the deep temperature cannot be correctly computed.

The third temperature Tout' corresponding to Tout, measured by the third temperature sensor 55, may thus be used to confirm whether a condition for enabling computation (the condition that the environment temperature (i.e., third temperature) is different in the first measurement and the second measurement) is satisfied, i.e., to determine whether to perform calculation.

Figures 22A, 22B:
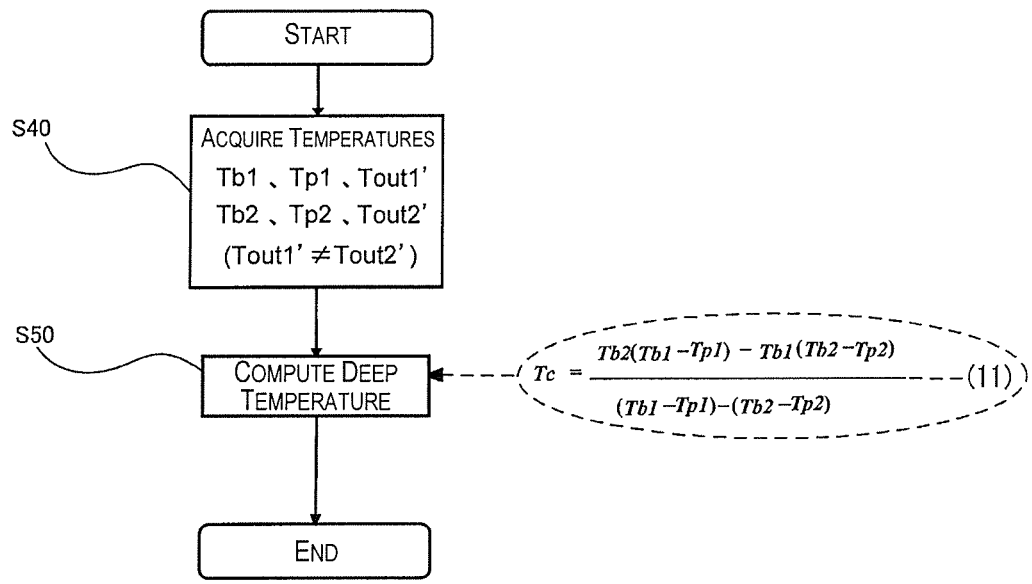
FIGS. 22A and 22B are views showing the procedure for measuring the deep temperature in the second embodiment, and an example of the deep temperature computation results in the second embodiment.

FIGS. 22A and 22B are views showing the procedure for measuring the deep temperature in the second embodiment, and an example of the deep temperature computation results in the second embodiment. Temperature data are first acquired (step S40). The temperature data include the first temperature Tb1, second temperature Tp1, and third temperature Tout1' obtained by the first measurement, and the first temperature Tb2, second temperature Tp2, and third temperature Tout2' (≠Tout1') obtained by the second measurement. The deep temperature Tc is then calculated by using the second computation equation (step S50).

FIG. 22B is a view showing an example of the deep temperature computation results in the second embodiment. The measurement environment shown in FIG. 13 is used herein. When the third temperature (environment equivalent temperature) Tout1' in the first measurement is 23° C., the first temperature Tb1 is 28.371° C., and the second temperature Tp1 is 26.2482° C. When the environment equivalent temperature (third temperature) Tout2' in the second measurement is 30° C., the first temperature Tb2 is 32.6855° C., and the second temperature Tp2 is 31.6241° C. The deep temperature Tc as the heat source is set to 37° C. The computed result for the deep temperature is 37.00000, and there is no error. It is therefore apparent that through the present embodiment, the deep temperature can be measured with extremely high precision.

As described above, through at least one embodiment of the invention, a deep temperature can be measured with higher precision. Reduced size of the temperature measurement part and highly precise measurement can also be obtained at the same time.

Several embodiments are described above, but it will be readily apparent to those skilled in the art that numerous modifications can be made herein without substantively departing from the new matter and effects of the invention. All such modifications are thus included in the scope of the invention. For example, in the specification or drawings, terms which appear at least once together with different terms that are broader or equivalent in meaning may be replaced with the different terms in any part of the specification or drawings.

What is claimed is:

1. A temperature measurement device comprising:
a substrate;
a first temperature sensor configured to measure first temperature at a first measurement point positioned on an outer surface of the substrate or inside of the substrate;
a second temperature sensor configured to measure second temperature at a second measurement point positioned on the outer surface of the substrate or inside of the substrate, the second measurement point being different from the first measurement point; and
a third temperature sensor configured to measure third temperature at a third measurement point positioned on the outer surface of the substrate or inside of the substrate, the third measurement point being different from the first and second measurement points,
the first temperature sensor, the second temperature sensor, and the third temperature sensor being configured to measure the first temperature, the second temperature, and the third temperature, respectively, at a plurality of times,
the first temperature being expressed by a first linear function having a first slope and a first intercept, the second temperature being a variable in the first linear function,
the first intercept of the first linear function being expressed by a second linear function having a second slope and a second intercept, the third temperature being a variable in the second linear function,
a plurality of constants corresponding to the first slope, the second slope, and the second intercept,
the first temperature sensor, the second temperature sensor, and the third temperature sensor measuring Tb1, Tp1, and Tout1' as the first temperature, the second temperature, and the third temperature, respectively, during a first measurement,
the first temperature sensor, the second temperature sensor, and the third temperature sensor measuring Tb2, Tp2, and Tout2', as the first temperature, the second temperature, and the third temperature, respectively, during a second measurement,
the first temperature sensor, the second temperature sensor, and the third temperature sensor measuring Tb3, Tp3, and Tout3', respectively, as the first temperature, the second temperature, and the third temperature, during a third measurement, and
the calculation part being configured to compute values of the first slope, the second slope, and the second intercept based on the first temperature Tb1, the second temperature Tp1, and the third temperature Tout1' that are measured during by the first measurement, the first temperature Tb2, the second temperature Tp2, and the third temperature Tout2' that are measured during the second measurement, and the first temperature Tb3, the second temperature Tp3, and the third temperature Tout3' that measured during the third measurement, and determining a deep temperature in a deep part of a measured body based on a deep temperature calculation equation that uses the values of the first slope, the second slope, and the second intercept that are calculated.

2. The temperature measurement device according to claim 1, wherein
the calculation part is configured to compute values of a, c, and d by using an equation, which is $$\begin{pmatrix} a \\ c \\ d \end{pmatrix} = \begin{pmatrix} Tp1 & Tout1' & 1 \\ Tp2 & Tout2' & 1 \\ Tp3 & Tout3' & 1 \end{pmatrix}^{-1} \begin{pmatrix} Tb1 \\ Tb2 \\ Tb3 \end{pmatrix},$$

where a is the first slope, c is the second slope, and d is the second intercept, and the calculation part determines the deep temperature Tc by a first computation equation, which is expressed by $$Tc = \frac{d}{1-a-c}.$$

3. A temperature measurement device comprising: a substrate;
a first temperature sensor configured to measure first temperature at a first measurement point positioned on an outer surface of the substrate or inside of the substrate;
a second temperature sensor configured to measure second temperature at a second measurement point positioned on the outer surface of the substrate or inside of the substrate, the second measurement point being different from the first measurement point; and
a third temperature sensor configured to measure third temperature at a third measurement point positioned on the outer surface of the substrate or inside of the substrate, the third measurement point being different from the first and second measurement points, the third temperature being indicative of environment temperature,
the first temperature sensor, the second temperature sensor, and the third temperature sensor being configured to measure the first temperature, the second temperature, and the third temperature, respectively, at a plurality of times,
the first temperature sensor, the second temperature sensor, and the third temperature sensor measuring measure Tb1, Tp1, and Tout1', as the first temperature, the second temperature, and the third temperature, respectively, during a first measurement,
the first temperature sensor, the second temperature sensor, and the third temperature sensor measuring measure Tb2, Tp2, and Tout2' as the first temperature, the second temperature, and the third temperature, respectively, during a second measurement, and
only when a value of the third temperature Tout1' is different from a value of the third temperature Tout2', the calculation part being configured to calculate a deep temperature Tc in a deep part of a measured body by using a second computation equation for the deep temperature, which uses the first temperature Tb1 and the second temperature Tp2 measured during the first measurement, and the first temperature Tb2 and the second temperature Tp2 measured during the second measurement, and which is expressed by $$Tc = \frac{Tb2(Tb1-Tp1) - Tb1(Tb2-Tp2)}{(Tb1-Tp1)-(Tb2-Tp2)}.$$

4. A method for measuring temperature, the method comprising:
measuring measure Tb1, Tp1, and Tout1' as a first temperature, a second temperature, and a third temperature by a first temperature sensor, a second temperature sensor, and a third temperature sensor, respectively, during a first measurement, the first temperature sensor being configured to measure the first temperature at a first measurement point positioned on an outer surface of a substrate or inside of the substrate, the second temperature sensor being configured to measure the second temperature at a second measurement point positioned on the outer surface of the substrate or inside of the substrate, the second measurement point being different from the first measurement point, the third temperature sensor being configured to measure the third temperature at a third measurement point positioned on the outer surface of the substrate or inside of the substrate, the third measurement point being different from the first and second measurement points;
measuring Tb2, Tp2, and Tout2', as the first temperature, the second temperature, and the third temperature by the first temperature sensor, the second temperature sensor, and the third temperature sensor, respectively, during a second measurement;
measuring Tb3, Tp3, and Tout3' as the first temperature, the second temperature, and the third temperature by the first temperature sensor, the second temperature sensor, and the third temperature sensor, respectively, during a third measurement;
computing values of a first slope, a second slope, and a second intercept based on the first temperature Tb1, the second temperature Tp1, and the third temperature Tout1' that are measured during by the first measurement, the first temperature Tb2, the second temperature Tp2, and the third temperature Tout2' that are measured during the second measurement, and the first temperature Tb3, the second temperature Tp3, and the third temperature Tout3' that measured during the third measurement, the first temperature being expressed by a first linear function having the first slope and a first intercept, the second temperature being a variable in the first linear function, the first intercept of the first linear function being expressed by a second linear function having the second slope and the second intercept, the third temperature being a variable in the second linear function, a plurality of constants corresponding to the first slope, the second slope, and the second intercept; and
determining a deep temperature in a deep part of a measured body based on a deep temperature calculation equation that uses the values of the first slope, the second slope, and the second intercept that are calculated.

* * * * *